United States Patent [19]
Shimizu et al.

[11] Patent Number: 6,085,323
[45] Date of Patent: Jul. 4, 2000

[54] INFORMATION PROCESSING SYSTEM HAVING FUNCTION OF SECURELY PROTECTING CONFIDENTIAL INFORMATION

[75] Inventors: Hideo Shimizu, Kawasaki; Satomi Hori, Yokohama; Naoki Endoh, Chiba-ken; Toshiaki Saisho, Tokyo, all of Japan

[73] Assignee: Kabushiki Kaisha Toshiba, Kawasaki, Japan

[21] Appl. No.: 08/837,097

[22] Filed: Apr. 14, 1997

[30] Foreign Application Priority Data

Apr. 15, 1996 [JP] Japan .................................. 8-092516
Nov. 29, 1996 [JP] Japan .................................. 8-320291

[51] Int. Cl.[7] ...................................................... H04L 9/00
[52] U.S. Cl. ........................... 713/201; 380/277; 380/278
[58] Field of Search ..................................... 380/4, 21, 25

[56] References Cited

U.S. PATENT DOCUMENTS

| | | | |
|---|---|---|---|
| 4,736,422 | 4/1988 | Mason | 380/228 |
| 5,623,546 | 4/1997 | Hardy | 380/4 |
| 5,719,938 | 2/1998 | Haas | 380/21 |
| 5,778,071 | 7/1998 | Caputo | 380/25 |
| 5,887,063 | 3/1999 | Varadharajan | 380/21 |

OTHER PUBLICATIONS

"RSA Secure International Version Information Sheet", RSA Data Security, Inc., 1995.

*Primary Examiner*—Gail O. Hayes
*Assistant Examiner*—Christopher M. Tucker
*Attorney, Agent, or Firm*—Oblon, Spivak, McClelland, Maier & Neustadt, P.C.

[57] ABSTRACT

An information processing system includes a first information processing apparatus and a second information processing apparatus arranged separate from the first information processing apparatus and capable of exchanging a signal with the first information processing apparatus. The first information processing apparatus includes a first key generator for generating a first key, and a first encrypting unit for encrypting data using the first key generated by the first key generator to generate first encrypted information. The second information processing apparatus includes a second key storage unit for storing a second key, and a second encrypting unit for encrypting the first key using the second key stored in the second storage unit to generate second encrypted information. The first information processing apparatus further includes a correlation storage unit for storing the first encrypted information generated by the first encrypting unit and the second encrypted information generated by the second encrypting unit, the first encrypted information being correlated with the second encrypted information.

56 Claims, 21 Drawing Sheets

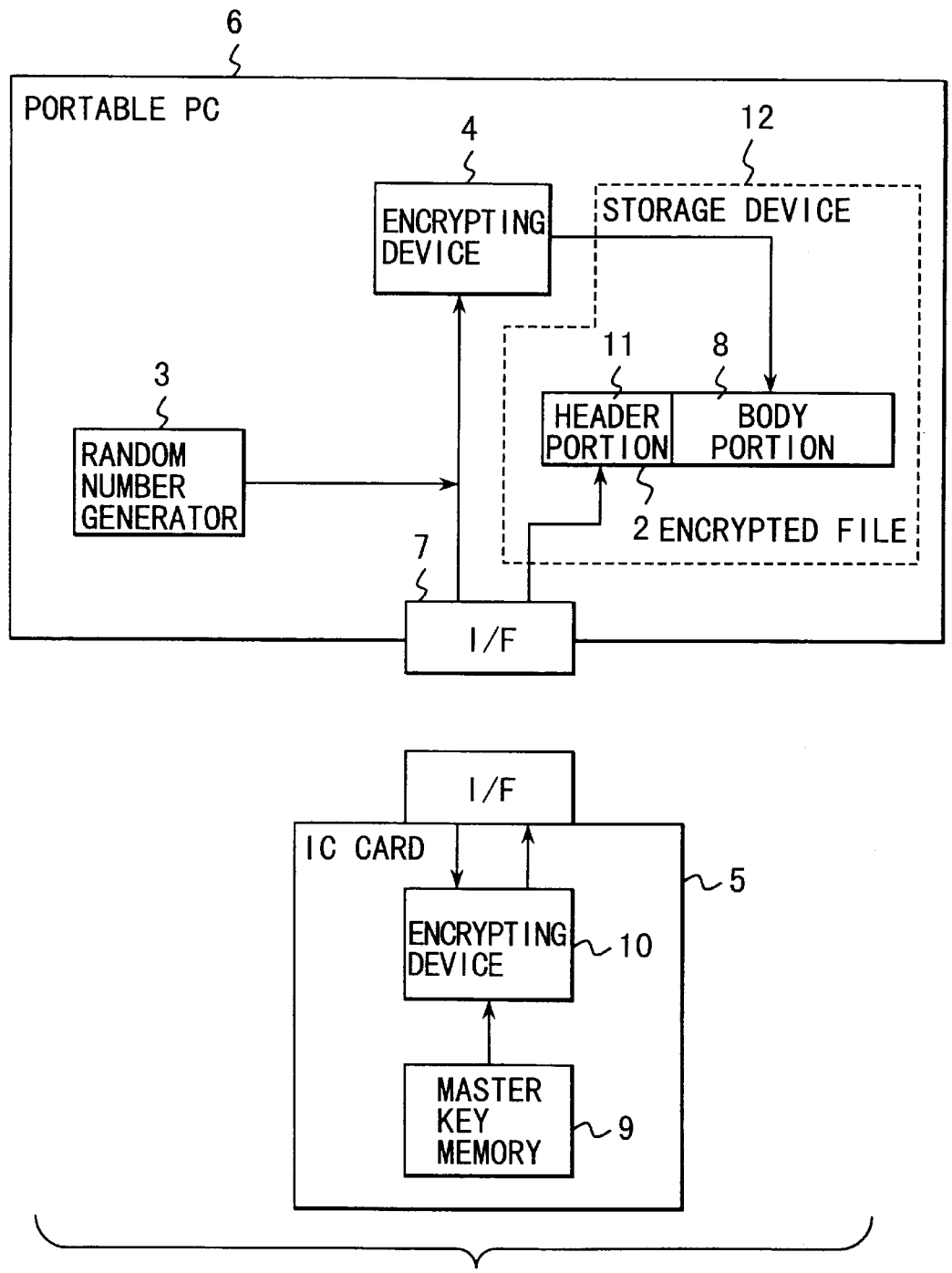
F I G. 2

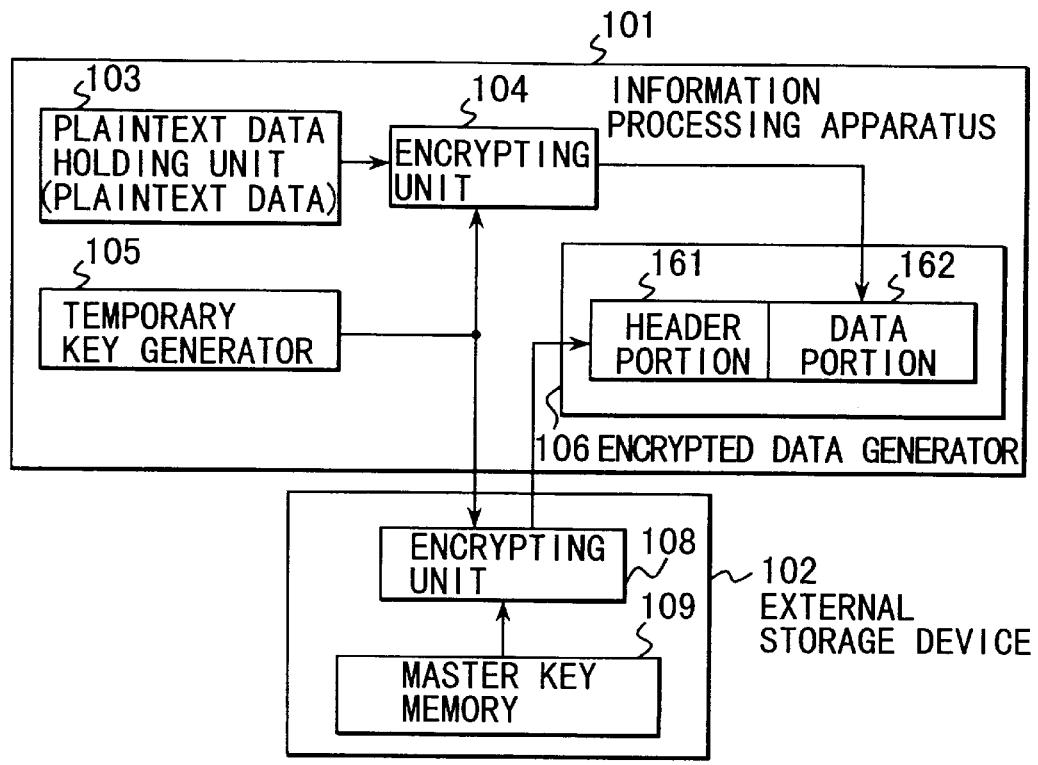
F I G. 8
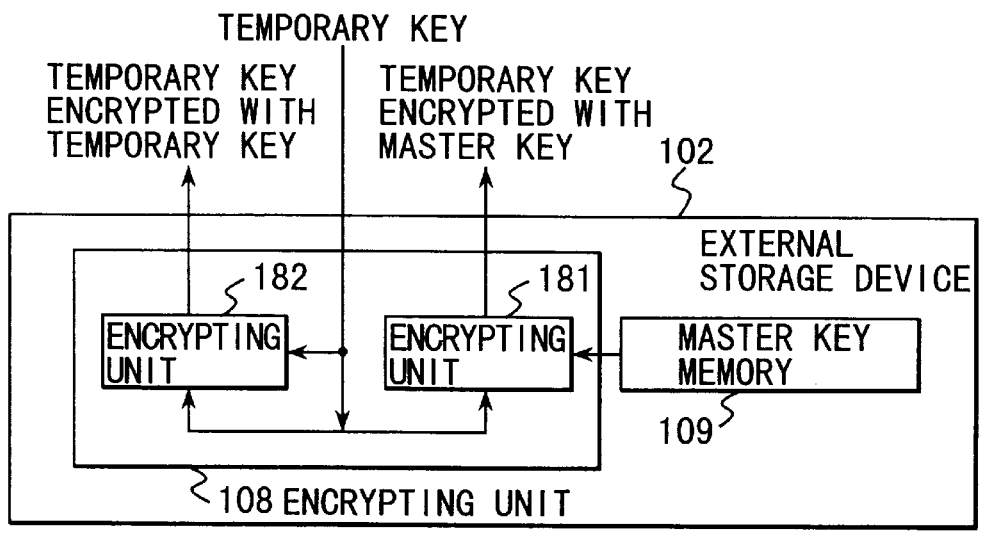
F I G. 9

| KEY ID | KEY DATA | USER INFORMATION |
|--------|----------|------------------|
|        |          |                  |
|        |          |                  |
| ⋮      | ⋮        | ⋮                |

F I G. 1 1

221
DISPLAY SCREEN

USER NAME
(INDIVIDUAL USER OR GROUP)

MR. A    GROUP X
MR. B    GROUP Y
MR. C    GROUP Z
⋮  223   ⋮
         224        225
         OK         CANCEL

222 WINDOW

F I G. 1 2

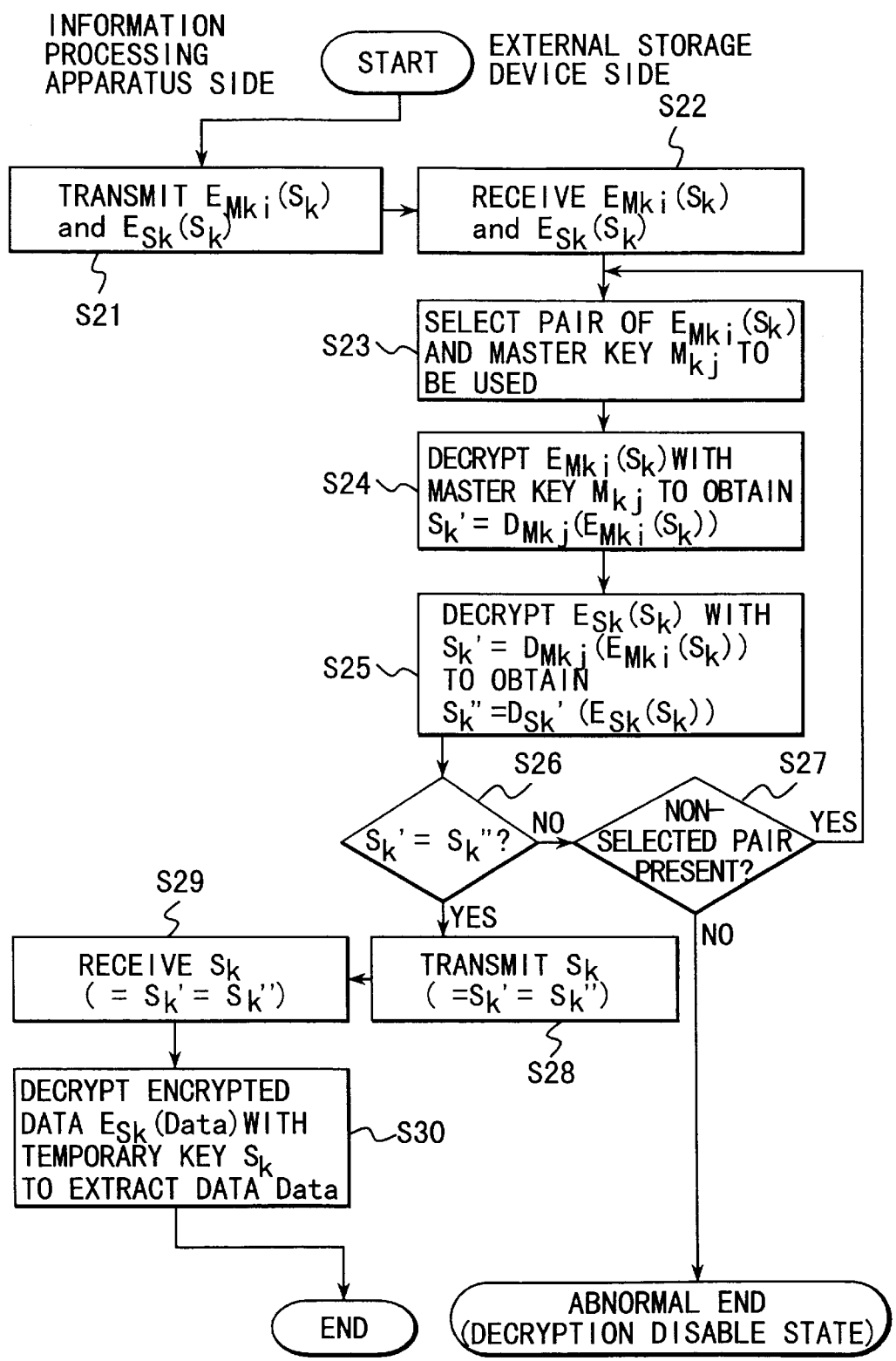
F I G. 16

KEY CHECK SCHEME: CHECK FUNCTION

| | $M_k$ ENCRYPTION/DECRYPTION | | $S_k$ ENCRYPTION/DECRYPTION | |
|---|---|---|---|---|
| | INCLUDING | NOT INCLUDING | INCLUDING | NOT INCLUDING |
| $M_k$ AND $S_k$ | $S_k(M_k)$<br>$S_k^{-1}(M_k)$ | $h(M_k \| S_k)$ | $M_k 2(S_k)$<br>$M_k^{-1}(S_k)$ | $h(M_k \| S_k)$ |
| ONLY $M_k$<br>$M_k$ AND OTHER DATA | $M_k(M_k)$<br>$M_k^{-1}(M_k)$<br>$M_k(M_k+\bar{d})$<br>$M_k^{-1}(M_k+\bar{d})$ | $M_k(\bar{d})$<br>$M_k^{-1}(\bar{d})$<br>$h(M_k)$ | ✕ | ✕ |
| ONLY $S_k$<br>$S_k$ AND OTHER DATA | ✕ | ✕ | $S_k(S_k)$<br>$S_k^{-1}(S_k)$ | $S_k(d)$<br>$S_k^{-1}(d)$<br>$h(S_k)$ |

F I G. 1 9

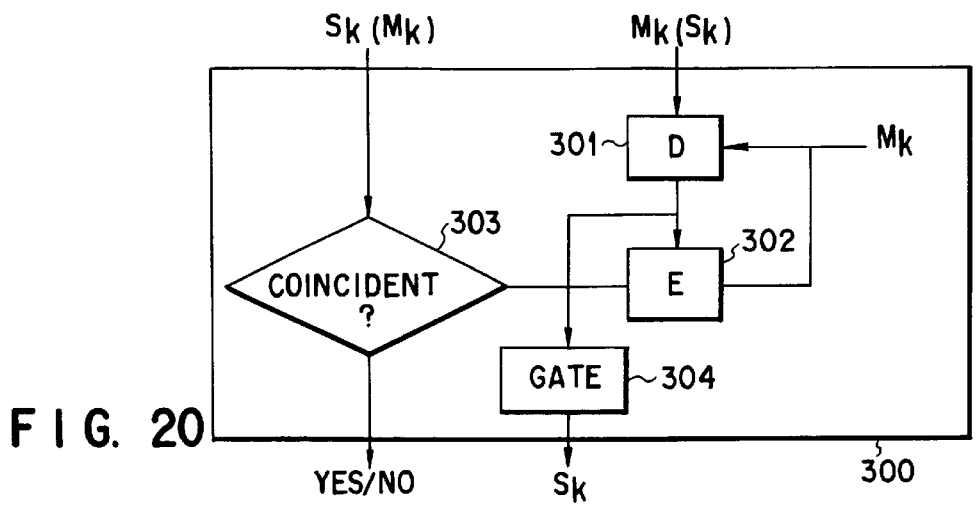
F I G. 20
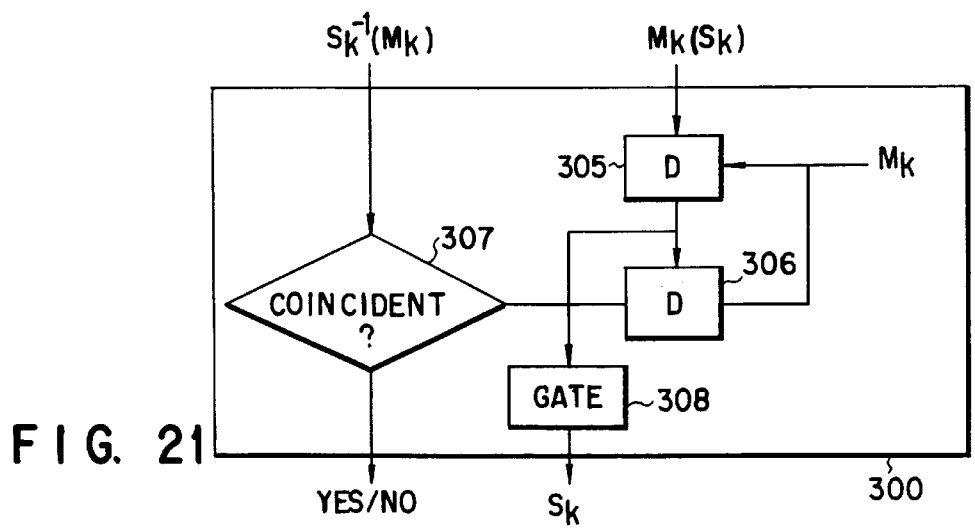
F I G. 21
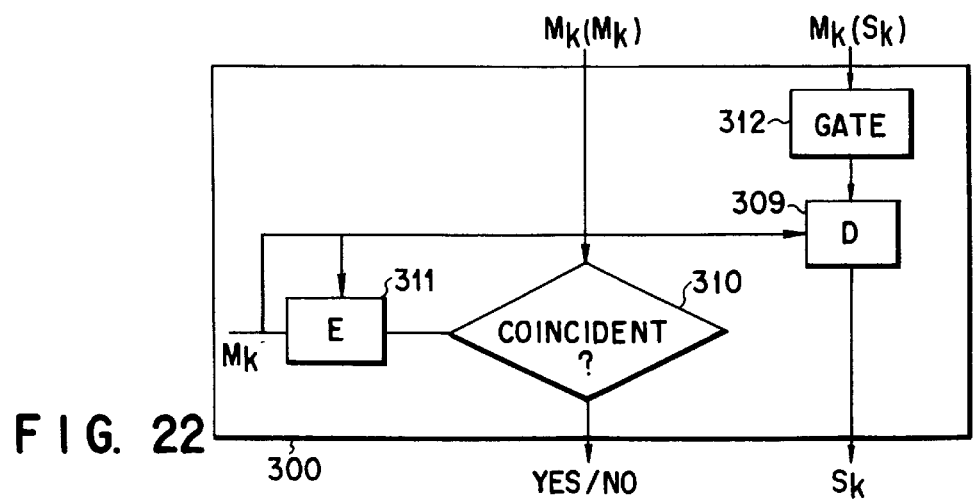
F I G. 22

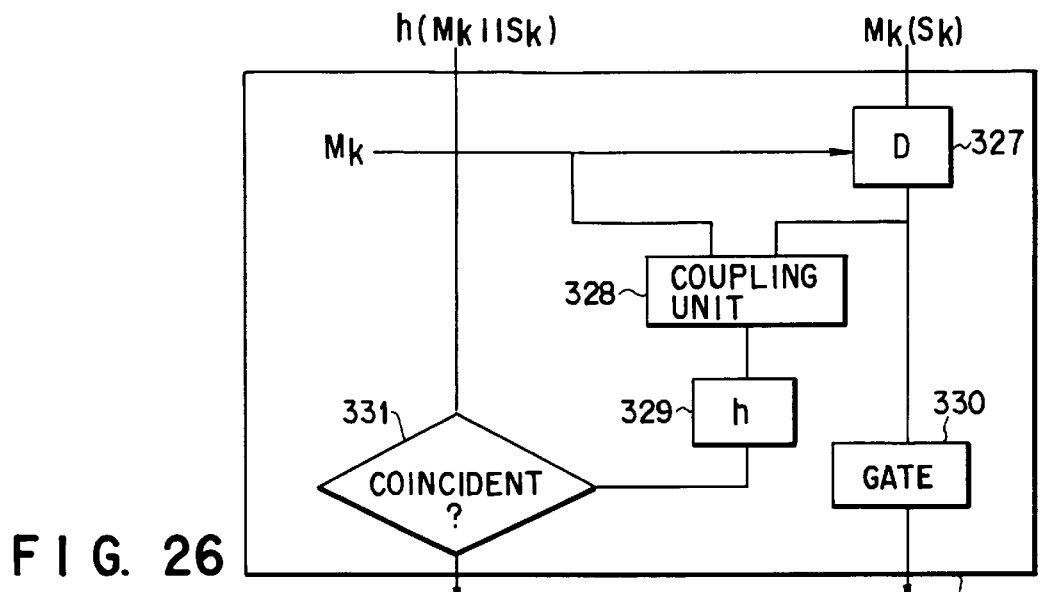
F I G. 26
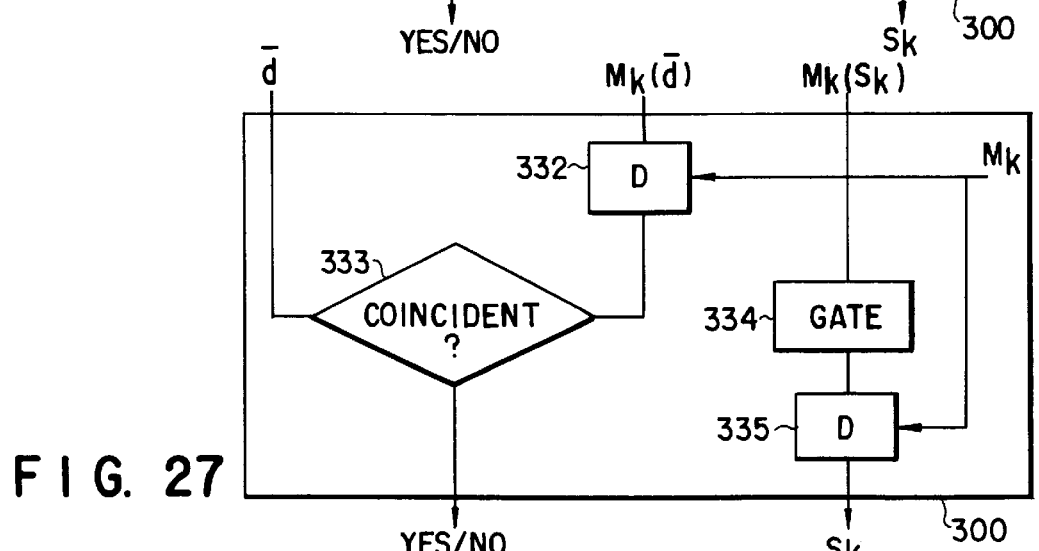
F I G. 27
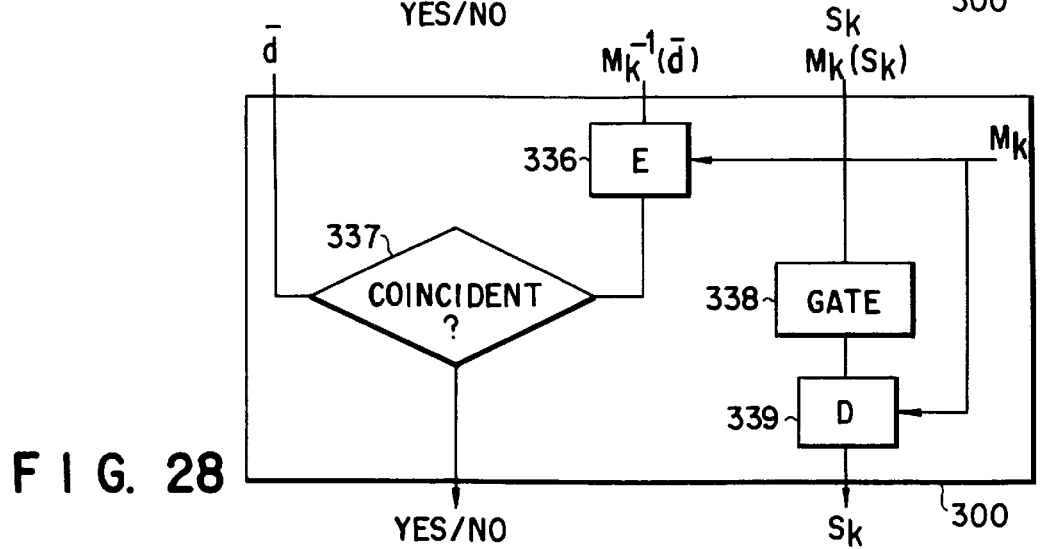
F I G. 28

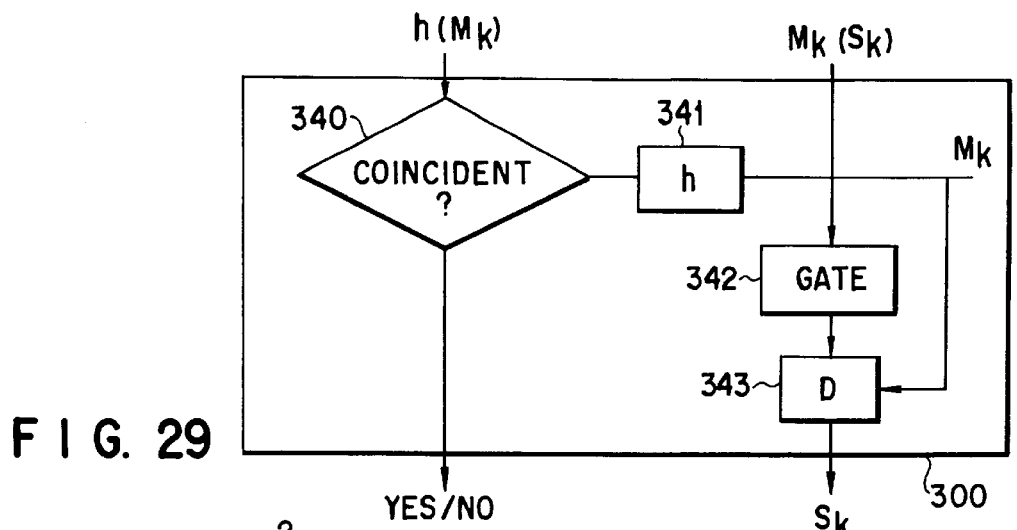
F I G. 29
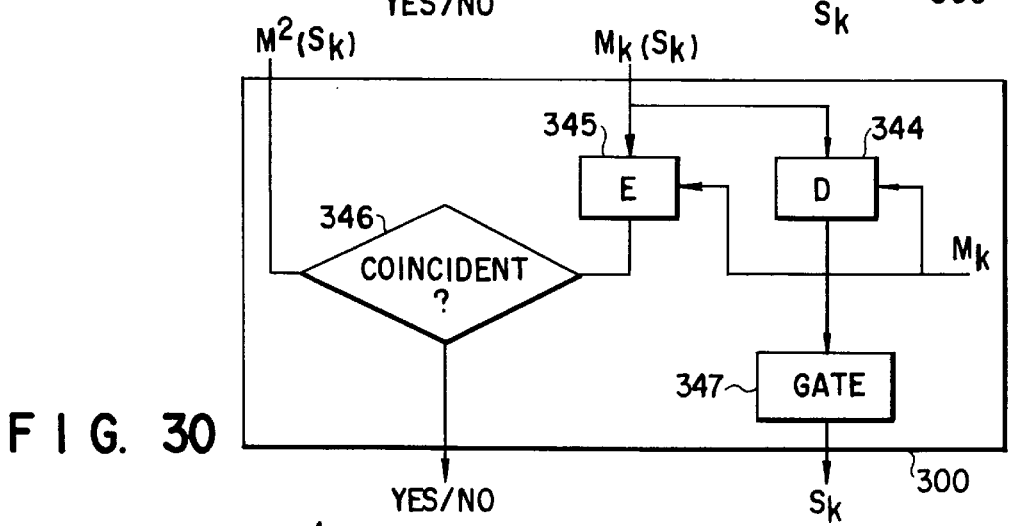
F I G. 30
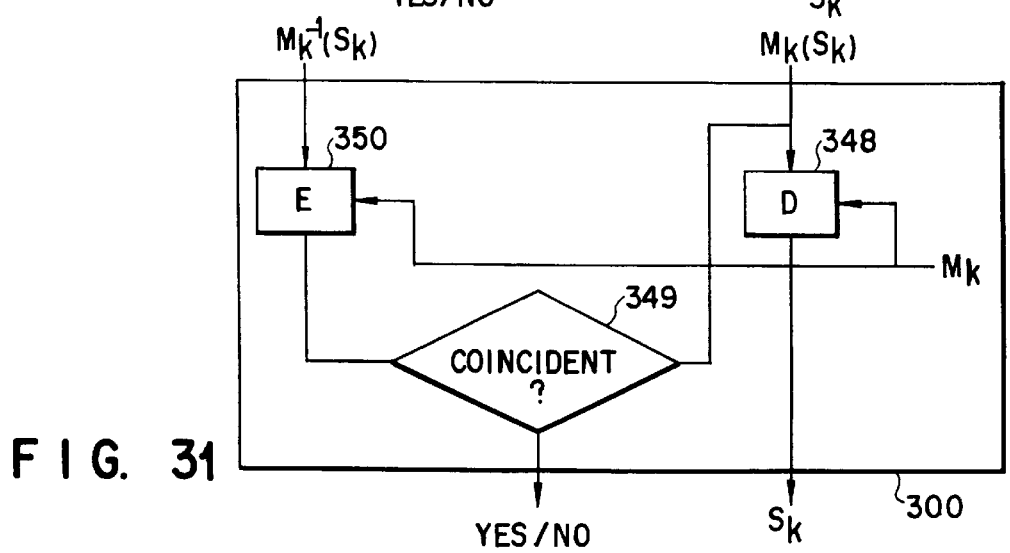
F I G. 31

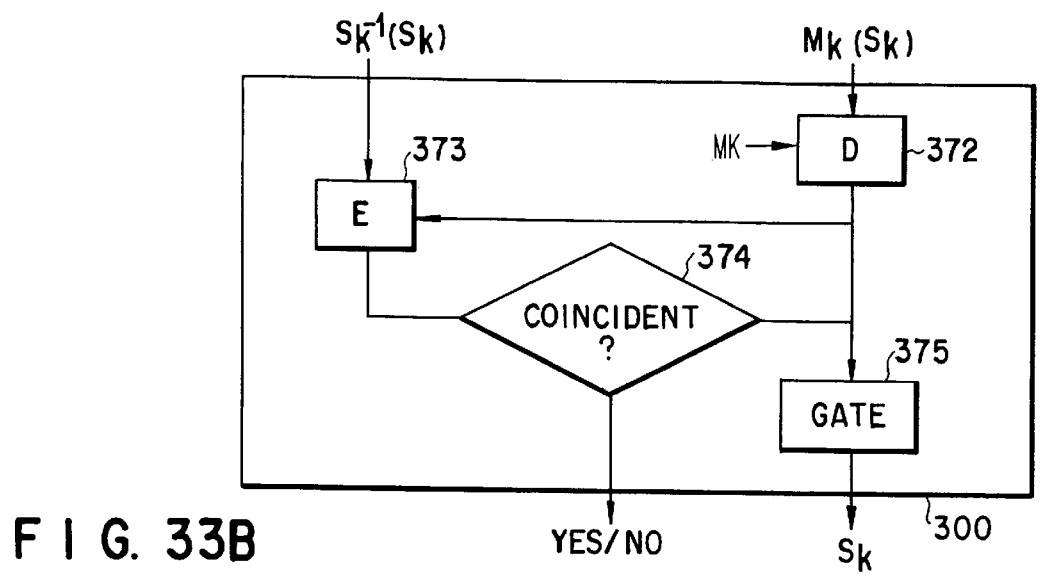
F I G. 33B
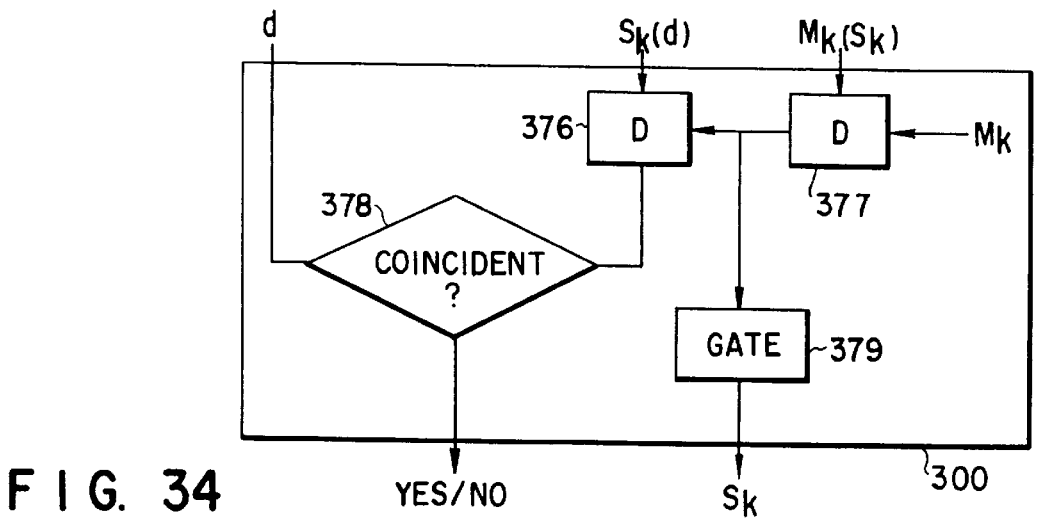
F I G. 34
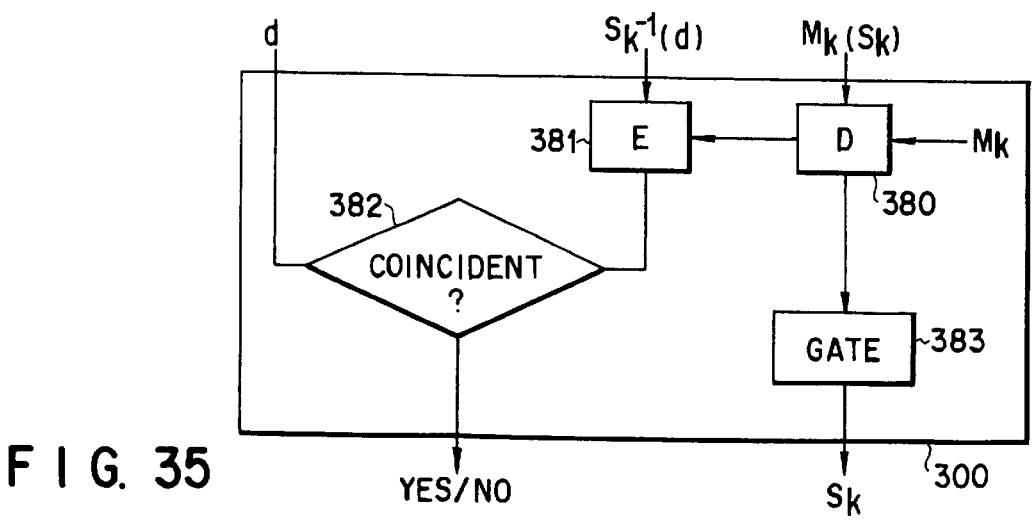
F I G. 35

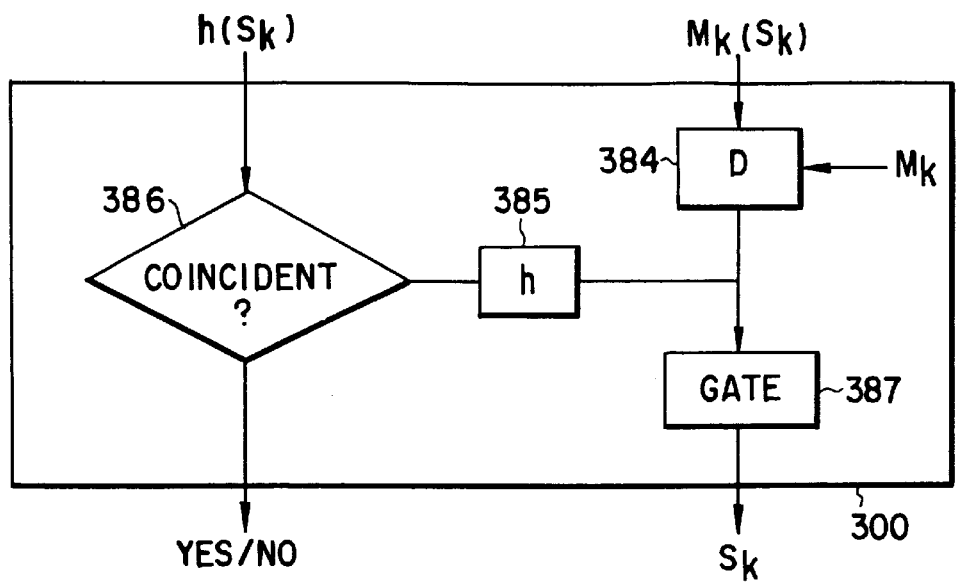
F I G. 36
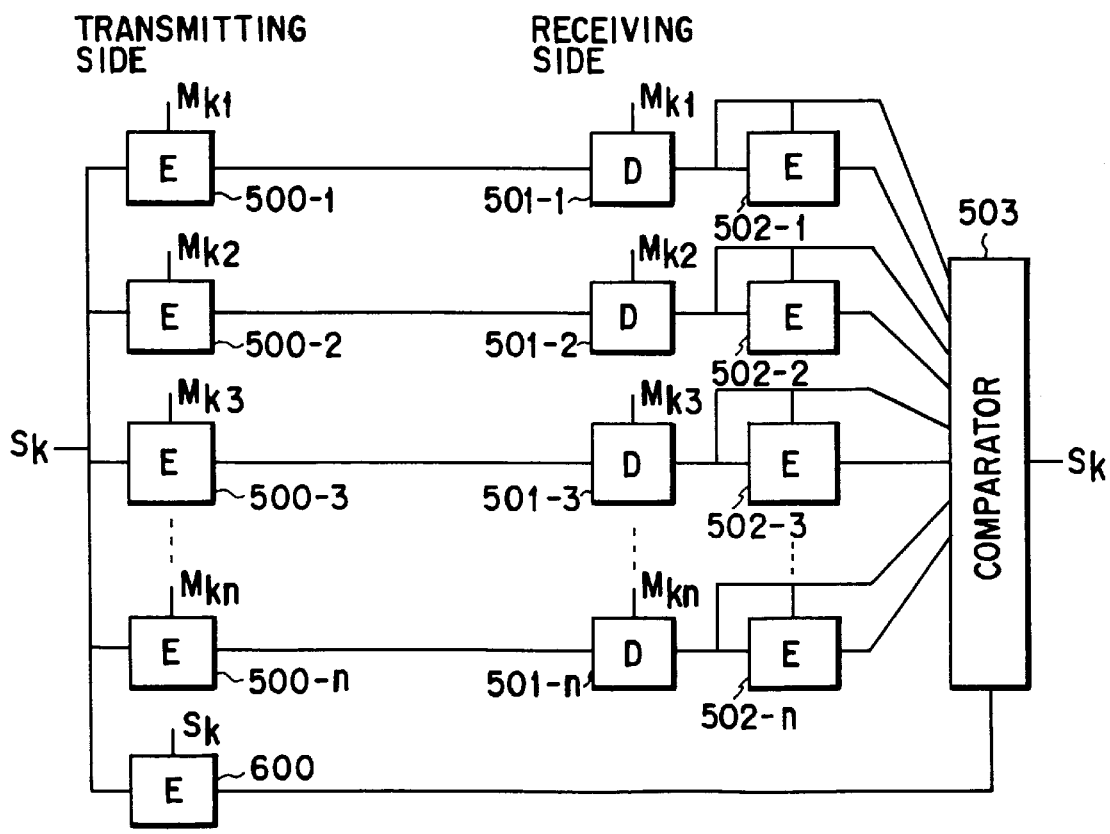
F I G. 37

INFORMATION PROCESSING SYSTEM HAVING FUNCTION OF SECURELY PROTECTING CONFIDENTIAL INFORMATION

BACKGROUND OF THE INVENTION

The present invention relates to an information processing system, an information processing method, a recording medium, and a key determination method and apparatus and, more particularly, to an information processing apparatus having a file encrypting system in a portable personal computer capable of exchanging signals with an IC card or the like, and to an information processing method, a recording medium, and a key determination method and apparatus.

In recent years, computers have been miniaturized along with the technical advance, and portable personal computers which can be carried by operators to desired places and operated at the desired places are commercially available. Such a portable personal computer incorporates a large-capacity external storage device such as a hard disk and can store a variety of application programs and files created by these programs although this personal computer is portable.

Computers except portable computers are often installed indoors. Confidential information stored in the computer can be protected from the illegal third party in accordance with a method such as restrictions of entrance/exit into/from a room where the computer is installed. Along with the development of communication networks, hacking from a local host computer to a remote host computer is possible. Even in this case, direct damage to the remote host computer itself can be prevented because the remote host computer is located at a physically remote place.

As the portable personal computer, however, can be carried, the computer itself may be stolen and confidential information stored in it may be stolen. There can be a method of preventing use of confidential information by a person except an authentic user using a password even if the portable computer is stolen. Even if this method is used, the computer is disassembled and a built-in hard disk is removed, so that the confidential information stored in the hard disk can be accessed. It is also difficult to manufacture a personal computer which cannot be disassembled. Even if such manufacturing is possible, the resultant computer becomes bulky and is not suitable for portability. At the same time, a new problem as an increase in manufacturing cost is posed.

In recent years, data are often shared by a plurality of users. Assume that one personal computer is shared by a plurality of users. In this case, data in a hard disk incorporated in this personal computer is to be shared. Also assume that the personal computers of the respective users are connected to each other through a LAN and a recording device connected to the LAN is shared by a plurality of users. In this case, the data in this recording device are shared.

It is, therefore, necessary not only to safely store personal data of users but also to assure safety of highly confidential data shared by the plurality of users.

In sharing the same data by a plurality of users, a pair of encrypting and decrypting keys for group use are required in addition to a pair of encrypting and decrypting keys for personal use. The same data is encrypted by the encrypting key for personal use of a user who shares the same data or the encrypting key for group use of a group who shares the same data. A plurality of encrypted data having the same contents are created and stored. For this reason, the number of keys increases, and the number of types of encrypted data increases. Therefore, management of key information and encrypted data becomes difficult, resulting in inconvenience.

In conventional decryption, the data contents may be destroyed because encrypted data is decrypted using a wrong key.

As described above, the introduction of portable personal computers improves convenience. However, the computer itself is stolen due to its portability, and confidential information stored in the computer is illegally accessed by the third party. Even if access to the confidential information is limited by a password or the like, the computer itself may be disassembled, and the hard disk incorporated in it can be removed. Therefore, it is possible to access confidential information stored in this hard disk.

To encrypt and store data shared by individual users or a group of users in the form which can be decrypted with each master key, a file encrypted using each master key must be stored. The following problems are posed. The data volume of files increases, the encrypting time becomes long, management of master keys and encrypted data becomes difficult, and data may be destroyed by erroneous decryption using a wrong master key.

BRIEF SUMMARY OF THE INVENTION

An information processing system according to the present invention has been provided in consideration of the above problems. It is an object of the present invention to provide an information processing apparatus, an information processing system, an information processing method, a recording medium, and a key determination method and apparatus, which are capable of protecting confidential information stored in the apparatus even if the apparatus is stolen and disassembled.

It is another object of the present invention to provide an information processing apparatus, an information processing system, an information processing method, a recording medium, and a key determination method and apparatus, capable of storing data shared by a plurality of users in an efficiently and safely encrypted form.

In order to achieve the above objects according to the present invention, there is provided an information processing system comprising a first information processing apparatus and a second information processing apparatus arranged separate from the first information processing apparatus and capable of exchanging a signal with the first information processing apparatus, wherein the first information processing apparatus comprises first key generation means for generating a first key, and first encryption means for encrypting data using the first key generated by the first key generation means to generate first encrypted information;

the second information processing apparatus comprises second key storage means for storing a second key, and second encryption means for encrypting the first key using the second key stored in the second key storage means to generate second encrypted information; and the first information processing apparatus further comprises correlation storage means for storing the first encrypted information generated by the first encryption means and the second encrypted information generated by the second encryption means, the first encrypted information being correlated with the second encrypted information.

According to the present invention, there is also provided an information processing system comprising a first information processing apparatus and a second information processing apparatus arranged separate from the first information processing apparatus and capable of exchanging a signal with the first information processing apparatus, wherein the first information processing apparatus comprises correlation storage means for storing first encrypted information obtained by encrypting data with a first key and second encrypted information obtained by encrypting the first key with a second key, the first encrypted information being correlated with the second encrypted information;

the second information processing apparatus comprises second key storage means for storing the second key, and first decryption means for decrypting the second encrypted information from the correlation storage means by using the second key stored in the second key storage means, thereby extracting the first key; and the first information processing apparatus further comprises second decryption means for decrypting the first encrypted information from the correlation storage means by using the first key extracted by the first decryption means, thereby obtaining the data.

According to the present invention, there is provided an information processing apparatus comprising:

first key generation means for generating a first key;

encryption means for encrypting data with the first key generated by the first key generation means;

input means for outputting the first key generated by the first key generation means to an external information processing apparatus and inputting, in the external information processing apparatus, the first key encrypted with a second key stored in the external information processing apparatus; and storage means for storing the encrypted first key input through the input means and the data encrypted by the encryption means, the encrypted first key being correlated with the encrypted data.

According to the present invention, there is provided an information processing method comprising:

the first key generation step of generating a first key in a first information processing apparatus;

the first encrypted information generation step of encrypting data using the generated first key to generate first encrypted information;

the output step of outputting the first key to a second information processing apparatus which is arranged separate from the first information processing apparatus and stores a second key;

the second encrypted information generation step of encrypting the first key using the second key in the second information processing apparatus to generate second encrypted information;

the output step of outputting the generated second encrypted information to the first information processing apparatus; and the storage step of storing the first encrypted information and the second encrypted information in correlation with the first encrypted information in the first information processing apparatus.

According to the present invention, there is provided a program storage device which stores a program readable from a machine in order to execute method steps for performing encryption processing, wherein the method steps comprise:

the first key generation step of generating a first key;

the encryption step of encrypting data with the generated first key;

the output step of outputting the generated first key to an external information processing apparatus;

the input step of inputting, in the external information processing apparatus, the first key encrypted with a second key stored in the external information processing apparatus; and the storage step of storing the encrypted input first key and the data encrypted with the first key, the encrypted input first key being correlated with the data encrypted with the first key.

According to the present invention, there is provided a key determination method in which a transmitting side uses a plurality of second keys to encrypt or decrypt a first key used for data encryption and transmits the encrypted or decrypted first key, and a receiving side extracts a second key corresponding to a specific second key of the receiving side from the plurality of second keys, comprising:

the input step of inputting first data obtained by encrypting or decrypting the first key with the plurality of second keys;

the input step of inputting second data processed by processing for obtaining the specific second key upon predetermined processing with a specific one of the first data which is encrypted or decrypted with the specific second key;

the extraction step of executing the predetermined processing on the basis of the input first and second data to extract the specific second key; and the output step of outputting the extracted specific second key.

According to the present invention, there is provided a key determination apparatus in which a transmitting side uses a plurality of second keys to encrypt or decrypt a first key used for data encryption and transmits the encrypted or decrypted first key, and a receiving side extracts a second key corresponding to a specific second key of the receiving side from the plurality of second keys, comprising:

first input means for inputting first data obtained by encrypting or decrypting the first key with the plurality of second keys;

second input means for inputting second data processed by processing for obtaining the specific second key upon predetermined processing with a specific one of the first data input from the first input means, the specific first data being encrypted or decrypted with the specific second key;

extraction means for executing the predetermined processing on the basis of the first data input from the first input means and the second data input from the second input means to extract the specific second key; and output means for outputting the specific second key extracted by the extraction means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a change in arrangement of the portable information processing system upon encryption;

FIG. 8 is a block diagram showing the arrangement of an information processing system (encryption side) according to the third embodiment of the present invention;

FIG. 9 is a block diagram showing the internal arrangement of an external storage device shown in FIG. 8;

FIG. 11 is a view showing a key information table;

FIG. 12 is a view showing a key selection/designation screen;

FIG. 16 is a flow chart showing a key determination operation sequence;

FIG. 19 is a table showing a plurality of classified check functions which can be input to the key determination system;

FIG. 20 is a block diagram showing the arrangement of the key determination system when $S_k(M_K)$ is input as a check function;

FIG. 21 is a block diagram showing the arrangement of the key determination system when $S_k^{-1}(M_k)$ is input as a check function;

FIG. 22 is a block diagram showing the arrangement of the key determination system when $M_k(M_k)$ is input as a check function;

FIG. 26 is a block diagram showing the arrangement of the key determination system when $h(M_k\|S_k)$ is input as a check function;

FIG. 27 is a block diagram showing the arrangement of the key determination system when $\overline{d}$ and $M_k(\overline{d})$ are input as check functions;

FIG. 28 is a block diagram showing the arrangement of the key determination system when $\overline{d}$ and $M_k^{-1}(\overline{d})$ are input as check functions;

FIG. 29 is a block diagram showing the arrangement of the key determination system when $h(M_k)$ is input as a check function;

FIG. 30 is a block diagram showing the arrangement of the key determination system when $M_k^2(S_k)$ is input as a check function;

FIG. 31 is a block diagram showing the arrangement of the key determination system when $M_k^{-1}(S_k)$ is input as a check function;

FIGS. 33A and 33B are block diagrams showing the arrangements of the key determination system when $S_k^{-1}(S_k)$ is input as a check function;

FIG. 34 is a block diagram showing the arrangement of the key determination system when d and $S_k(d)$ are input as check functions;

FIG. 35 is a block diagram showing the arrangement of the key determination system when d and $S_k^{-1}(d)$ are input as check functions;

FIG. 36 is a block diagram showing the arrangement of the key determination system when $h(S_k)$ is input as a check function;

FIG. 37 is a view for explaining the first application example of the key determination system according to the fifth embodiment;

DETAILED DESCRIPTION OF THE INVENTION

The preferred embodiments of the present invention will be described in detail with reference to the accompanying drawing.

Figure 1:
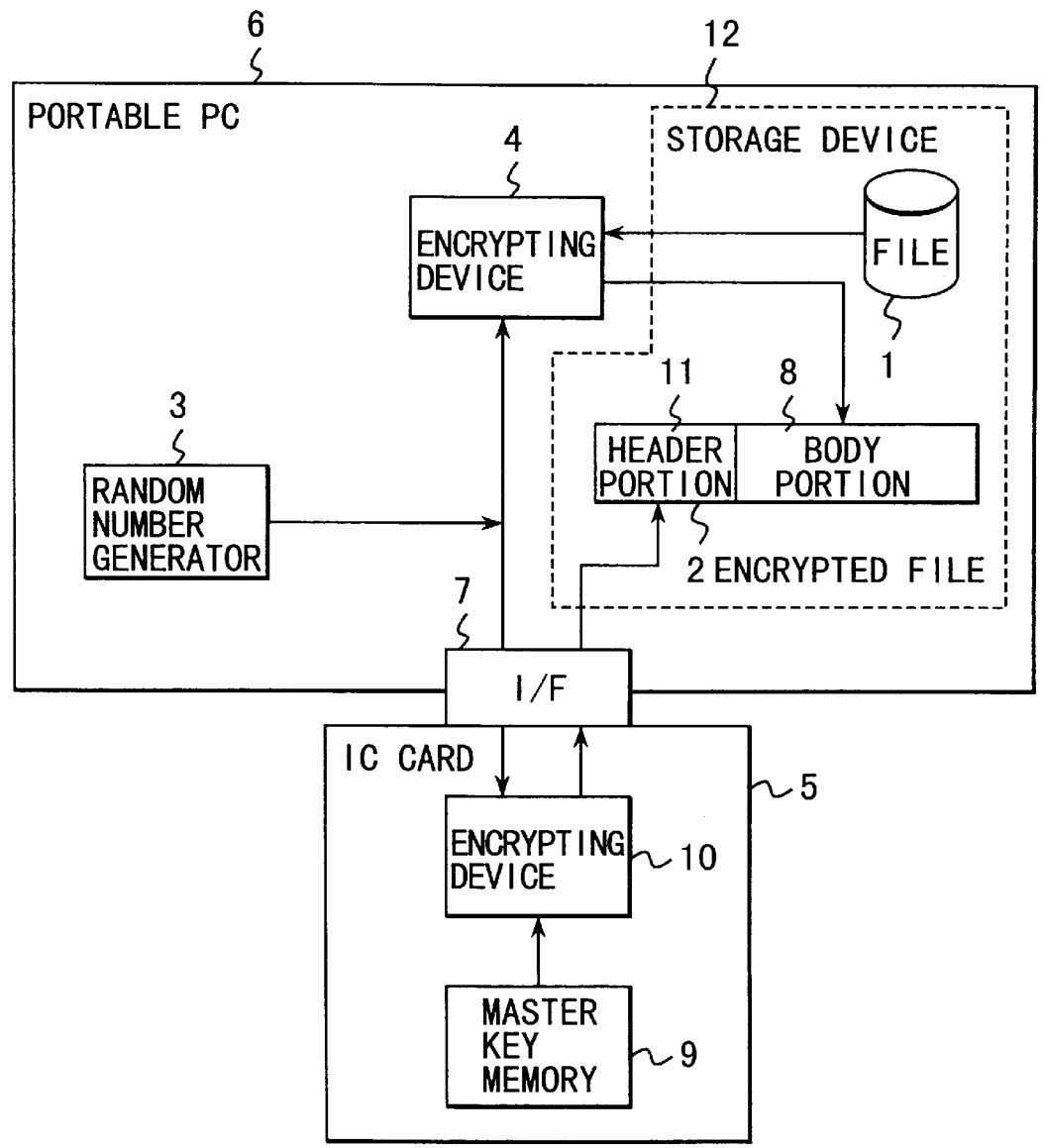
FIG. 1 is a block diagram showing an encrypting arrangement in a portable information processing system to which an information processing system according to the first embodiment of the present invention is applied.

FIG. 1 is a block diagram showing an encrypting arrangement in a portable information processing system to which an information processing system according to the first embodiment of the present invention is applied.

The information processing system of the present invention comprises a portable personal computer (to be referred to as a portable PC hereinafter) 6 serving as an information processing apparatus and an IC card 5 serving as an external storage device detachably loaded in the portable PC 6.

Referring to FIG. 1, a temporary key generated by a random number generator 3 arranged in the portable PC 6 is transferred to an encrypting device 4. A file 1 having confidential information and temporarily stored in a storage device 12 such as a hard disk drive in the portable PC 6 is also transferred to the encrypting device 4.

The encrypting device 4 encrypts the file 1 having the confidential information to obtain a body portion 8 serving as the first encrypted data of an encrypted file 2.

The temporary key generated by the random number generator 3 is also transferred to an encrypting device 10 in the IC card 5 through an external interface (to be referred to as an external I/F hereinafter) 7. The encrypting device 10 encrypts the transferred temporary key using a master key stored in a master key memory 9 and transfers the encrypted temporary key to the storage device 12 in the portable PC 6 through the external I/F 7. The transferred data serves as a header portion 11 as the second encrypted data of the encrypted file 2.

It is also possible to provide the random number generator 3 in the IC card 5 instead of in the portable PC 6, so as to decrease the cycle of data transfer.

The file 1 is encrypted as described above, and the encrypted file 2 obtained by synthesizing the header portion 11 and the body portion 8 is stored in the storage device 12. At the same time, the original file 1 is erased.

FIG. 2 is a view showing a modification in arrangement of the portable information processing system upon encryption. More specifically, while the file 1 is encrypted and stored as the encrypted file 2 in the storage device 12, the original file 1 having the confidential information is deleted from the storage device 12. The IC card 5 which stores the master key is removed from the portable PC 6, and the portable PC 6 and the IC card 5 are separately stored.

Data stored as the encrypted file 2 are information (body portion 8) obtained by encrypting the original file 1 and information (header portion 11) obtained by encrypting with the master key the temporary key used in encryption. These pieces of information are encrypted data. Even if the portable PC 6 storing only the encrypted file 2 is stolen, illegal access to both the master key and the encrypted information can be prevented, thereby preventing leakage of confidential information, because IC card 5 storing the master key is stored separate from the portable PC 6.

Note that the algorithm used in the encrypting device 4 in the portable PC 6 may be identical to or different from the algorithm used in the encrypting device 10 in the IC card 5.

Temporary keys for encryption generated by the random number generator are different in units of, e.g., files to improve safety.

Figure 3:
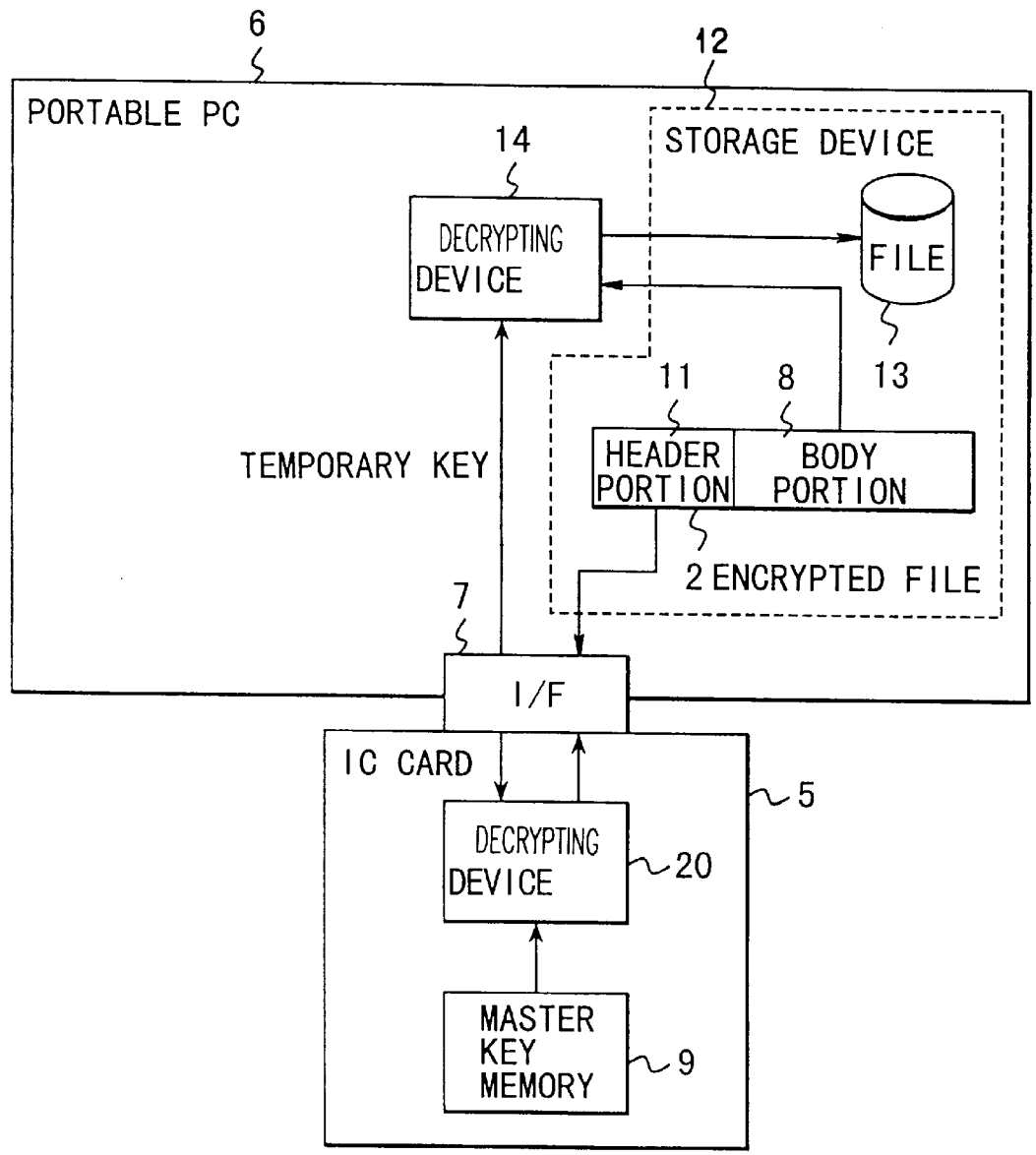
FIG. 3 is a block diagram showing a decrypting arrangement in the portable information processing system to which the information processing system according to the first embodiment of the present invention is applied.

FIG. 3 is a view showing the arrangement of a decrypting arrangement in the portable information processing system to which the information processing system according to the first embodiment of the present invention is applied.

The arrangement shown in FIG. 3 is basically obtained by replacing the encrypting function with the decrypting function in the system configuration shown in FIG. 1. In an actual information processing system, a device having both the encrypting and decrypting functions is used. Since it is assumed that the encrypting function in FIG. 1 and the decrypting function in FIG. 3 are performed in the same portable information processing system, the same reference numerals denote the same arrangements and parts, and a detailed description thereof will be omitted.

The information processing system shown in FIG. 3 comprises the portable PC 6 serving as an information processing apparatus and the IC card 5 serving as an external storage device detachably loaded in the portable PC 6.

Referring to FIG. 3, the encrypted file 2 in the portable PC 6 is decomposed into the header portion 11 and the body portion 8. The header portion 11 is transferred to a decrypting device 20 in the IC card 5 through the external I/F 7. The decrypting device 20 decrypts the input data using the master key stored in the master key memory 9, thereby extracting the original temporary key used in encryption. The extracted temporary key is transferred to a decrypting device 14 in the portable PC 6 through the external I/F 7. The decrypting device 14 decrypts the body portion 8 decomposed using this temporary key, thereby obtaining the original file 1.

According to the first embodiment, as described above, the file is encrypted using the master key stored in the IC card detachably loaded in the portable PC, and the encrypted file is stored in the internal hard disk. The file cannot be decrypted unless the IC card is loaded. When the IC card is carried separate from the PC, the confidential information can be protected even if the portable PC is stolen.

The file itself is encrypted in the portable PC using the temporary key. Only the temporary key is encrypted with the master key in the IC card externally loaded into the portable PC. This improves encryption efficiency, and no master key is loaded in the portable PC. At the same time, double encryption is performed to further improve safety for the confidential information.

Even if a master key is stored in an IC card having a calculation capability, the master key itself is not loaded or stored in the portable PC. For example, even if a program such as a Trojan horse is installed in the portable PC, the master key is not illegally accessed by the third party.

If IC cards having different calculation capabilities are selectively used, encryption and decryption processing operations can be performed at high speed. An IC card having a low calculation capability can be used if the processing speed is of no importance.

Different keys are used in units of files, and this therefore improves safety.

Even if a master key is known to the third party, and the file must be encrypted again, only the header portion is encrypted. This efficiently shortens the encryption time.

In DES encryption, as is known well, a key used in encryption is derived by collecting pairs of a large number of files and encrypted files. According to the above embodiment, however, since each file is encrypted into a corresponding key every time, and a plaintext file corresponding to the portion encrypted by the master key is not stored in the portable PC at the time of decryption, files cannot be collected. Even if files can be collected, it is almost impossible to repeat encryption processing until a sufficient number of files are collected. More specifically, in a method of directly encrypting a file with a master key, the key used in encryption can be derived, provided that a file to be encrypted is sufficiently long. According to this embodiment, however, since the master key itself is not used for directly encrypting the file, a sufficient number of files for deriving the key cannot be collected even if a sufficient long file is encrypted.

In the above embodiment, a case has been described in which the number of header portions for storing the temporary key encrypted using the master key is one. However, a plurality of header portions may be used. For example, when one PC is used by a group consisting of a plurality of users to share information, an encryption key used by each individual member and an encryption key commonly used by the group are required. In this case, a plurality of header portions must be prepared. Alternatively, a plurality of headers may be prepared to allow a plurality of users to access internal files, and the third party may access an internal file in place of an authentic user who cannot access the internal file due to some reason.

In the above embodiment, signals are exchanged between the information processing apparatus and the external storage device using the IC card detachably loaded in the portable PC. However, the mechanical detachable arrangement may be replaced with a method such as infrared, radio, or optical (e.g., laser beam) communication to exchange signals between the information processing apparatus and the external storage device.

Figure 4:
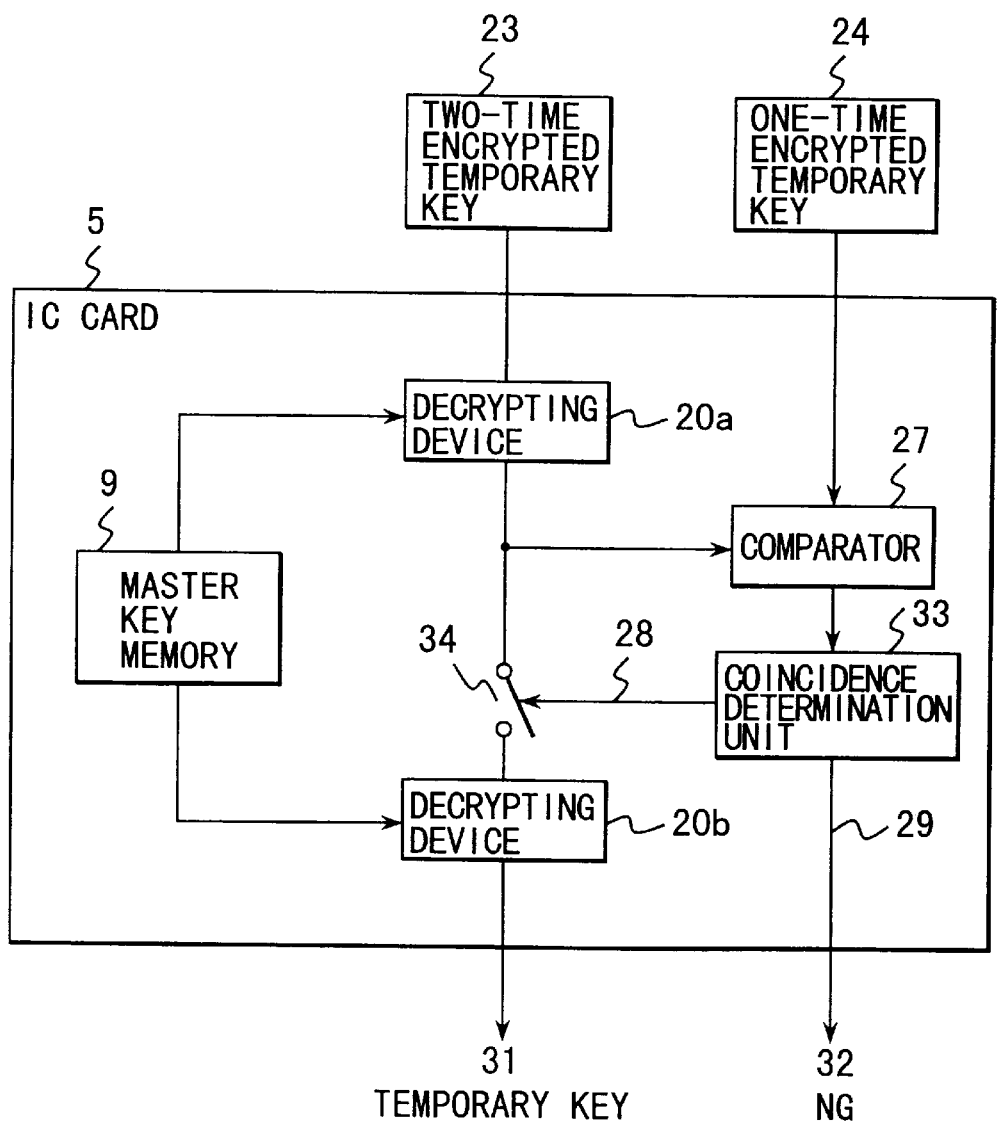
FIG. 4 is a block diagram showing the arrangement of a key determination system for realizing key determination according to the second embodiment of the present invention.

FIG. 4 is a block diagram showing, as the second embodiment, the arrangement of a key determination system for realizing a key determination method which is applicable to the information processing system shown in FIGS. 1 to 3. In particular, FIG. 4 is a block diagram showing an arrangement for extracting a temporary key while determining a master key used in decryption. Assume that a temporary key (i.e., a temporary key encrypted twice with a master key; third encrypted data) obtained by encrypting with a master key a temporary key encrypted using the master key stored in a master key memory 9 in FIG. 1 is stored in advance in a header portion 11 of an encrypted file at the time of encryption.

At the time of decryption, a two-time encrypted temporary key 23 serving as the third encrypted data and a one-time encrypted temporary key 24 serving as the second encrypted data are supplied to an IC card 5, as shown in FIG. 4. A decrypting device 20a decrypts the two-time encrypted temporary key 23 using the master key (specific master key) stored in the master key memory 9 and outputs the decrypted temporary key. A comparator 27 compares this decrypted temporary key with the one-time encrypted temporary key 24 and outputs a comparison result to a coincidence determination unit 33. The coincidence determination unit 33 determines on the basis of this comparison result whether the decrypted temporary key coincides with the one-time encrypted temporary key.

When the coincidence determination unit 33 determines a coincidence, it outputs a coincidence signal 28 to close a switch 34. The decrypted temporary key from the decrypting device 20a is further decrypted in a decrypting device 20b using the master key stored in the master key memory 9 to obtain an original temporary key 31. When this key determination system is applied to the system shown in FIG. 3, the resultant original temporary key 31 is transferred to the portable PC 6 and used to decrypt the encrypted file 2. Note that the decrypting devices 20a and 20b are represented by two separate decrypting devices in terms of functional blocks, but can be actually constituted by one decrypting device.

If the coincidence determination unit 33 determines that the decrypted temporary key does not coincide with the one-time encrypted key 24, an incoincidence signal 29 is output to obtain an NG state 32.

According to the second embodiment described above, the temporary key obtained by decrypting the two-time encrypted temporary key using the master key is compared with the one-time encrypted temporary key. If the coincidence is established, the master key used in decryption can be determined to be the same as that used in encryption. However, if the coincidence is not established, the temporary key is decrypted using a master key different from that used in encryption.

When the incoincidence is established, the wrong master key is made unusable to prevent leakage of the confidential file and prevent erroneous destruction of the file. In addition, when one portable PC is shared by a plurality of users, and a user erroneously decrypts a file encrypted by another user, the temporary key is lost. In this case, the original file cannot be decrypted even if it is encrypted again. However, since no decryption is performed when the one-time encrypted temporary key does not coincide with the key obtained by decrypting the two-time encrypted temporary key. Therefore, decryption using a wrong temporary key can be prevented.

Figure 5:
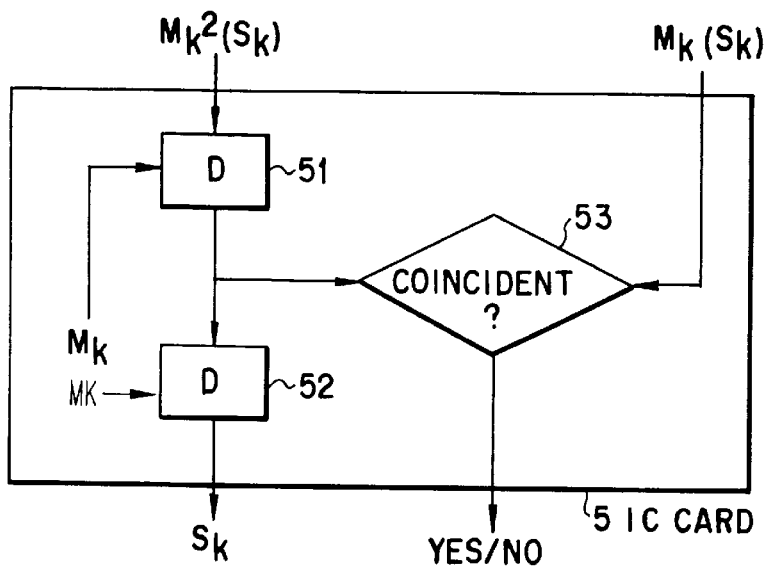
FIG. 5 is a block diagram showing the simplified arrangement of the system shown in FIG. 4.

The arrangement shown in FIG. 4 is simplified as an arrangement shown in FIG. 5. Referring to FIG. 5, reference symbol $S_k$ denotes a temporary key; and $M_k$, a master key. Data (24 in FIG. 4) obtained by encrypting the temporary key $S_k$ once with the master key $M_k$ is represented as $M_k(S_k)$. Reference symbol D denotes decryption. $M_k^2(s_{2k})$ represents data (23 in FIG. 4) obtained by encrypting twice with the master key. Reference numerals 51 and 52 denote decrypting devices which correspond to the decrypting devices 20a and 20b in FIG. 4, respectively. Reference numeral 53 denotes a comparison/determination unit which corresponds to the comparator 27 and the coincidence determination unit 33 in FIG. 4.

Figure 6:
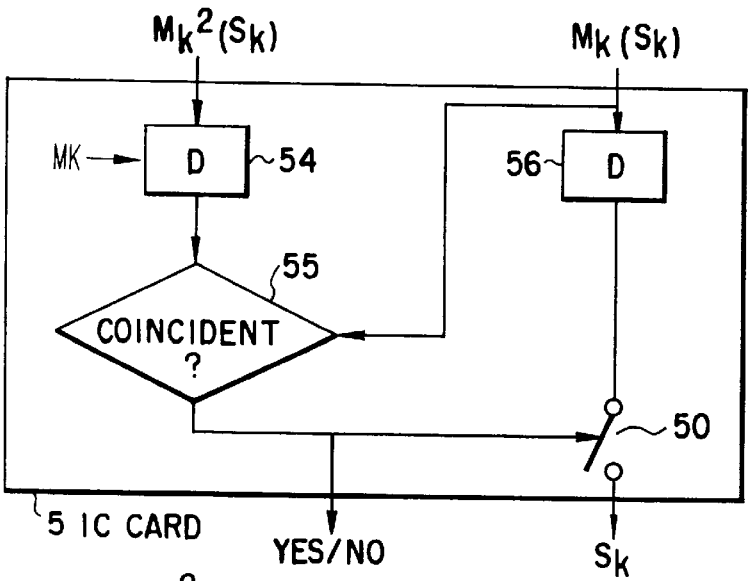
FIG. 6 is a block diagram showing a modification of the arrangement shown in FIG. 5.

FIG. 6 is a block diagram showing a modification of the arrangement shown in FIG. 5. This modification comprises two decrypting devices 54 and 56, a comparison/determination unit 55, and a switch 50. In this arrangement, as compared with the arrangement shown in FIG. 5, the decryption processing operations in the decrypting devices 54 and 56 are simultaneously performed to advantageously achieve high-speed processing.

Figure 7:
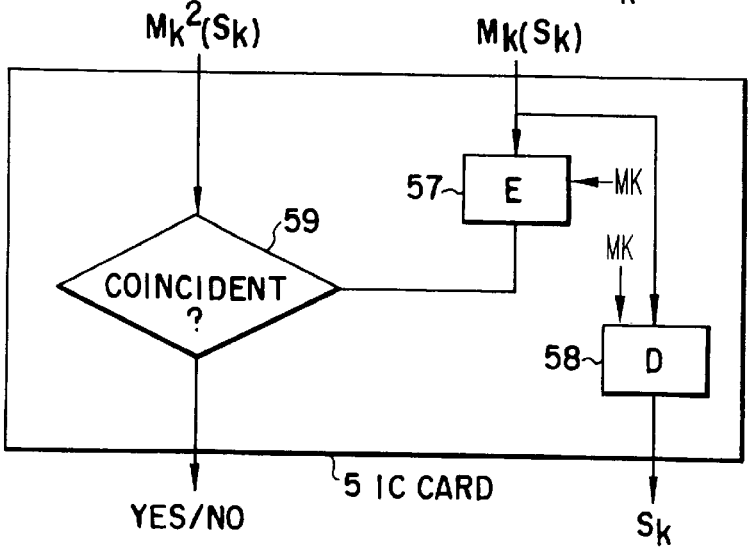
FIG. 7 is a block diagram showing another modification of the arrangement shown in FIG. 5.

FIG. 7 is a block diagram showing another modification of the arrangement shown in FIG. 5. This modification comprises an encrypting device 57, a decrypting device 58, and a comparison/determination unit 59. In this arrangement, two decrypting devices are required in the arrangement of FIG. 6, the encrypting device 10 in encryption can be used as the encrypting device 57. At the same time, encryption processing in the encrypting device 57 and decryption processing in the decrypting device 58 are simultaneously performed to advantageously achieve high-speed processing.

According to the first and second embodiments of the present invention, even if a portable computer is stolen or disassembled, the confidential information stored in the portable computer can be protected. In addition, file destruction and confidential information leakage which are caused by decryption using a wrong master key can be prevented.

FIG. 8 is a block diagram showing the arrangement of an information processing system (encryption side) according to the third embodiment of the present invention.

According to the general operations of the information processing system of this embodiment, in the information processing apparatus serving as an encryption side, a predetermined temporary key is generated, data serving as an encryption object is encrypted using the predetermined temporary key, and encryption of this temporary key is requested to an external storage device which stores the master key and has a processing function. In the external storage device having the processing function, predetermined encryption using the predetermined master key stored in the external storage device is performed for the received temporary key, and the encrypted key is returned to the information processing apparatus.

It is also possible to generate the temporary key in the external storage device instead of in the information processing apparatus, so as to decrease the cycle of data transfer.

According to the general operations of the information processing system of this embodiment, in the information processing apparatus serving as a decryption side, decryption of a temporary key contained in encrypted data and a key encrypted based on a master key is requested to the external storage device which stores the master key and has a processing function. In the external storage device having the processing function, predetermined decryption is performed on the basis of information of the received encrypted key and the predetermined master key stored in the external storage device to extract the original temporary key. The original temporary key is turned to the information processing apparatus. In the information processing apparatus, the encrypted data is decrypted using the input temporary key.

Each information processing apparatus may be used by a single user or shared by a plurality of users. Note that the external storage device which stores a master key and has a processing function (to be described later) is preferably prepared for each user.

In this embodiment, an operation for encrypting given data a with a key K is expressed as $E_K(a)$, and an operation for decrypting the given data a with the key K is expressed as $D_K(a)$. By using these expressions, for example, an operation for decrypting with a key K2 data obtained by encrypting the given data a with the key K1 is expressed as $D_{k2}(E_{k1}(a))$.

In this embodiment, a desired common key encrypting scheme such as DES or FEAL is used for a scheme for encrypting data serving as an encryption object and a scheme for encrypting a temporary key used for encrypting or decrypting this data. Note that the former scheme for encrypting processing object data may be identical to or different from the latter scheme for encrypting the temporary key.

Examples of the data as encryption objects are a document, speech, an image, and a program. Various other examples are also considered.

Encrypted data serving as a decryption object in this embodiment is constituted by a header portion containing information of an encrypted key and a data portion containing encrypted data. Examples of the encrypted data are a file, a packet, and a cell.

An encryption-side information processing system and a decryption-side information processing system will be sequentially described below. Note that when the present invention is applied to an information processing apparatus, the present invention may have only an encryption-side arrangement, only a decryption-side arrangement, or both the encryption-and decryption-side arrangements. Similarly, when the present invention is applied to the external storage device having a processing function, the present invention may have only an encryption-side arrangement, only a decryption-side arrangement, or both the encryption-and decryption-side arrangements.

Plaintext data, a temporary key, a master key, data encrypted with a temporary key, a temporary key encrypted with a master key, and a temporary key encrypted with a temporary key are expressed as Data, $S_k$, $M_k$, $E_{Sk}$(Data), $E_{Mk}(S_k)$, $E_{Sk}(S_k)$, respectively.

The encryption-side information processing system will now be described below.

FIG. 8 is a block diagram showing the arrangement of an encryption-side information processing apparatus 101 and an encryption-side external storage device 102 in the information processing system of the third embodiment of the present invention.

The information processing apparatus 101, the external storage device 102, a temporary key generator 105, encrypting units 104 and 108, and an encrypted data generator 106 correspond to the portable PC 6, the IC card 5, the random number generator 3, the encrypting devices 4 and 10, and the storage device 10 of the first embodiment, respectively.

The information processing apparatus 101 generates a temporary key and encrypts data. The information processing apparatus 101 comprises, e.g., a personal computer.

The external storage device 102 stores a master key and encrypts a temporary key. The external storage device 102 comprises, e.g., an IC card having a processing function.

The information processing apparatus 101 and the external storage device 102 exchange data through their interface units (not shown). For example, in operation, the external storage device 102 may be directly connected to a socket of the information processing apparatus 101 or may communicate with the information processing apparatus 101 using an infrared ray or the like.

When the external storage device 102 is not used, the user preferably stores it in a safe place.

As shown in FIG. 8, the information processing apparatus 101 on the data encryption side comprises a plaintext data holding unit 103, the encrypting unit 104, the temporary key generator 105, and the encrypted data generator 106.

The plaintext data holding unit 103 holds plaintext data serving as an encryption object.

Data as an encryption object may be read out from a predetermined storage device, obtained through a wire communication line or radio communication channel, created or edited on the information processing apparatus, or directly captured from a video or audio equipment to the information processing apparatus.

The temporary key generator 105 generates a temporary key for encrypting data held in the plaintext data holding unit 103. The temporary key generator 105 generates a temporary key for at least each data using a random number generated by a random number generator (not shown). This random number generator may generate a random number on the basis of, e.g., time information obtained from a clock (not shown) at a predetermined timing. In addition, different temporary keys are preferably generated every time identical data are to be encrypted. Note that the random number generator may be arranged on the information processing apparatus 101 side or the external storage device 102 side.

The temporary key is also transferred to the external storage device 102 through interface units.

The encrypting unit 104 encrypts data held in the plaintext data holding unit 103, by using the temporary key generated by the temporary key generator 105.

The encrypted data generator 106 generates encrypted data containing a header portion 161 and a data portion 162. The header portion 161 contains a temporary key encrypted using one or a plurality of master keys returned from the external storage device 102 through the interface units, and a temporary key encrypted by itself. The data portion 162 contains data encrypted using the temporary key generated by the encrypting unit 104. Note that the original plaintext data is deleted when the encrypted data generator 106 generates encrypted data.

The data obtained by encryption is stored in, e.g., a storage device such as a built-in hard disk of the information processing apparatus 1 or a removable storage medium such as a floppy disk or CD-ROM. Alternatively, the resultant encrypted data is transferred to a file management apparatus through a LAN or transmitted to one or a plurality of desired transfer destinations (decryption-side information processing apparatus) through a wire communication line or radio communication channel.

Various master key management methods are proposed and exemplified as a method of defining all master keys as personal master keys, and a method of preparing personal master keys and a group master key shared by each group. For example, when personal master keys and a group master key shared by each group are to be prepared, a temporary key encrypted with zero, one, or a plurality of personal master keys, a temporary key encrypted with zero, one, or a plurality of group master keys, or a temporary key encrypted by itself is added to the header portion of each encrypted data. In this case, the header portion of each encrypted data has a variable length.

Note that a maximum number of master keys usable in encrypting temporary keys may be set, and the header portion may be used to have a fixed length.

The external storage device 102 on the temporary key encryption side will be described below.

The temporary storage device 102 has a function of holding master key information and a function of inhibiting output of data of this master key and encrypting a temporary key transferred from the information processing apparatus 101 and outputting only this encryption result to the information processing apparatus 101.

As shown in FIG. 8, the external storage device 102 on the temporary key encryption side comprises a master key memory 109 and the encrypting unit 108.

The master key memory 109 stores one or a plurality of pieces of master key information.

The external read and write accesses to the master key memory 109 are preferably inhibited. However, upon authentication of a password, if access to the master key memory 109 is allowed, the master key information may be added, deleted, or the like.

The encrypting unit 108 receives a temporary key transmitted from the information processing apparatus 101 through the interface units and encrypts the temporary key using one or a plurality of predetermined master keys. At the same time, the encrypting unit 108 encrypts this temporary key by itself.

FIG. 9 shows the internal arrangement of the encrypting unit 108 in the external storage device 102. Note that encrypting units 181 and 182 in FIG. 9 may be independently arranged or constituted by one encrypting unit which is used by switching operations.

The temporary key encrypted by one or a plurality of master keys and the temporary key encrypted by itself are transmitted to the information processing apparatus 101 through the interface units. These temporary keys are stored in the header portion 161 of the encrypted data by the encrypted data generator 106.

A master key used in encrypting a temporary key in the external storage device 102 can be designated by the following methods.

(1) All the master keys stored in the master key memory 109 are used, and a temporary key encrypted by each master key is generated.

Figure 10:
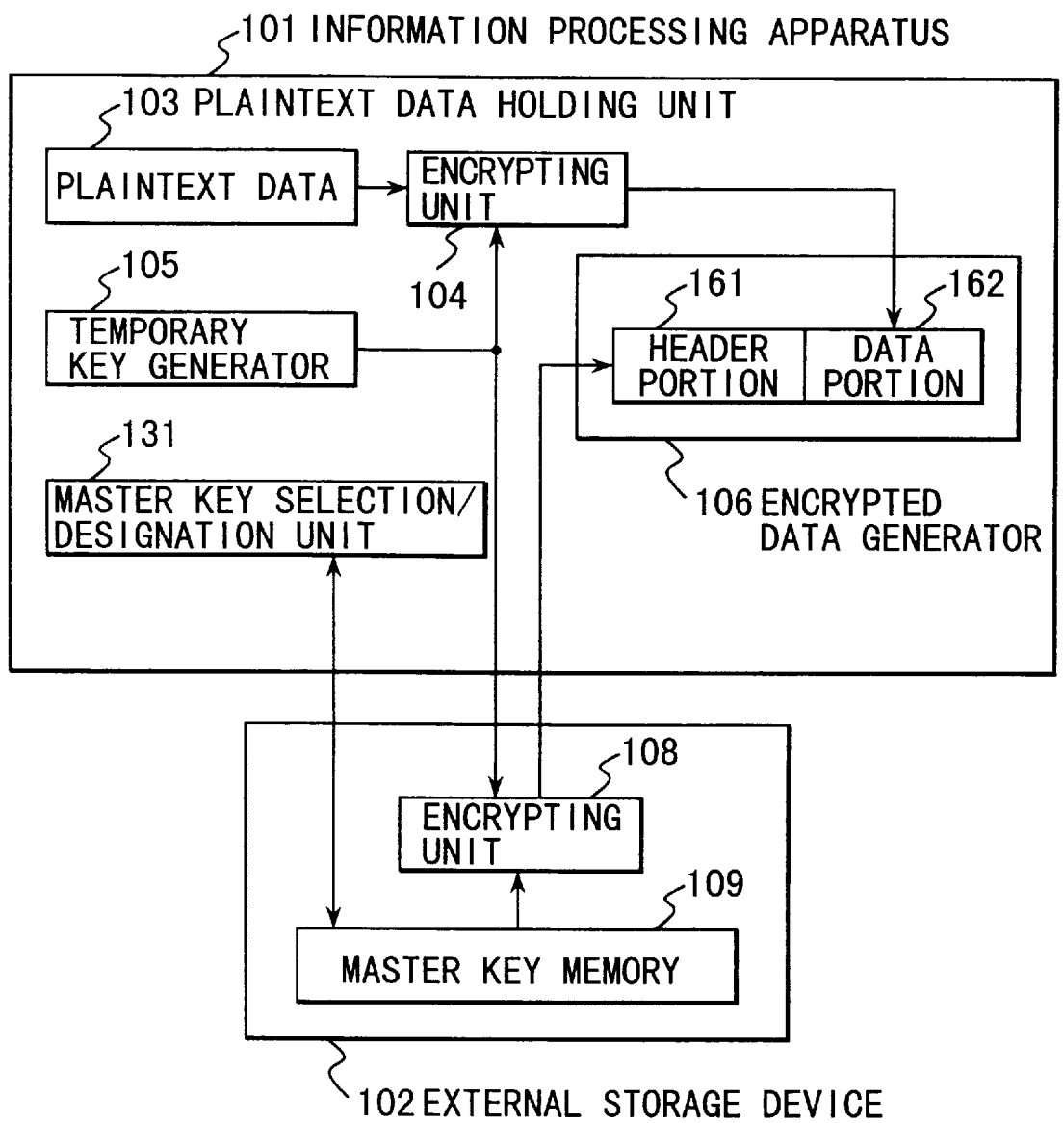
FIG. 10 is a block diagram showing the arrangement of an information processing system including a master key selection/designation unit.

(2) Some of the master keys stored in the master key memory 109 are designated from the information processing apparatus 101, and a temporary key encrypted by each of the designated master keys is generated. An example is shown in FIGS. 10 and 11. For example, as shown in FIG. 11, key IDs, key data, and pieces of user information (e.g., personal information such as user names and/or user IDs) in correlation with each other are stored in the master key memory 109 in the external storage device 102. A master key selection/designation unit 131 in the information processing apparatus 101 obtains information except key data from the master key memory 109. A key selection/designation window 222 is opened on a display screen 221 of a display device (not shown) to display a list of user or group names corresponding to the key data, as shown in FIG. 12. Each user moves an icon to the display position of a desired user or group name on the window 222 with a mouse (not shown) and clicks the mouse button to select and designate the desired user or group name. The master key designation information containing the user ID and/or key ID corresponding to the user or group name selected and designated by the user is transmitted from the information processing apparatus 101 to the external storage device 102. Thereafter, the external storage device 102 looks up the table in FIG. 11 to encrypt information using the key data corresponding to the designated user ID or the like.

(3) In addition, master key designation information containing a condition for user information in FIG. 11 is also transmitted from the information processing apparatus 101 to the external storage device 102, and key information having user information meeting this condition is used.

Figure 13:
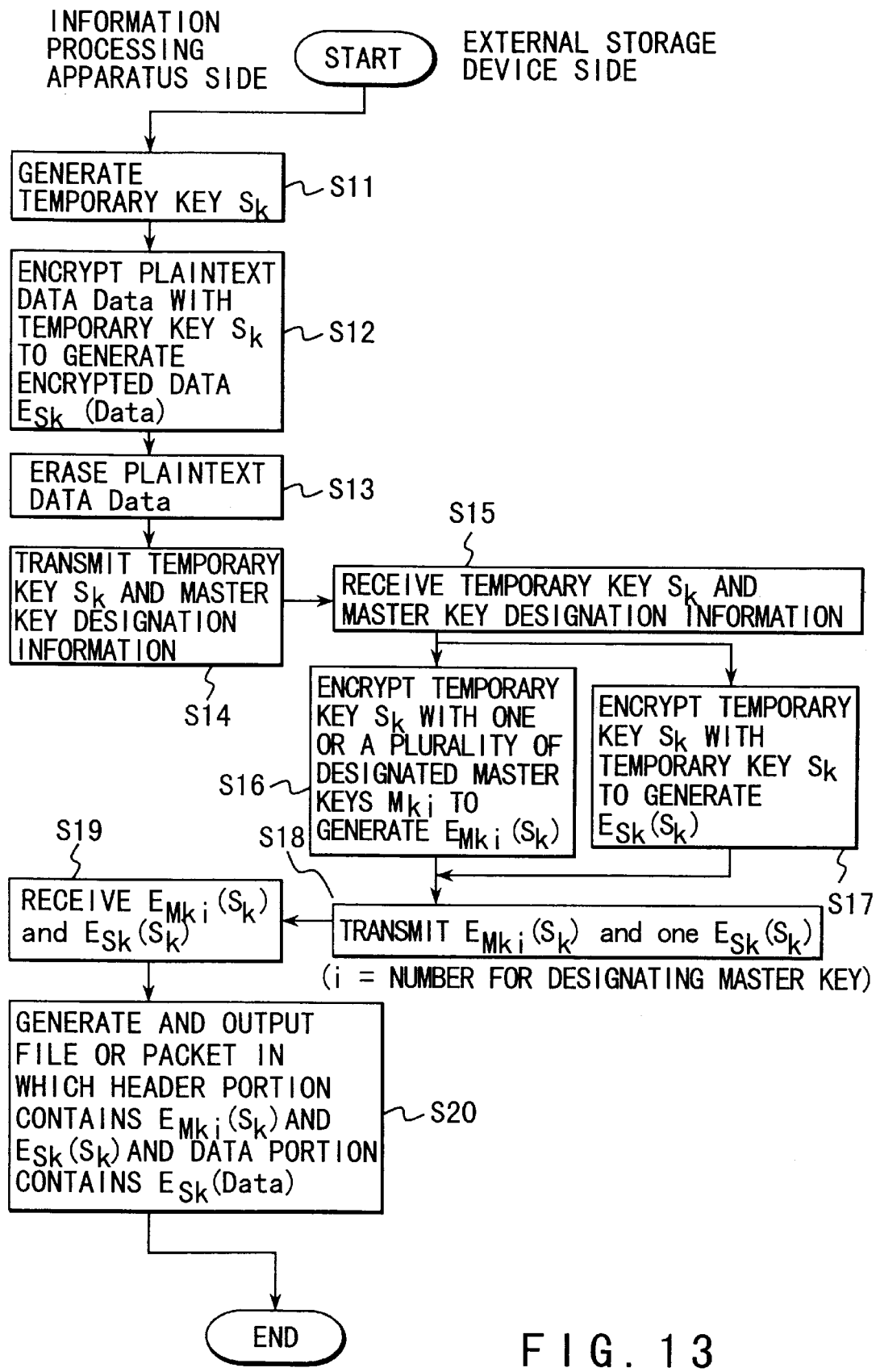
FIG. 13 is a flow chart showing an encrypting operation sequence.

FIG. 13 shows the operation sequence of the information processing system.

On the information processing apparatus 101 side, the temporary key $S_k$ is generated by the temporary key generator 105 (step S11). The encrypting unit 104 encrypts with the temporary key $S_k$ the plaintext data Data stored in the plaintext data holding unit 103 to generate the encrypted data $E_{Sk}$(Data) (step S12).

When the encrypted data $E_{Sk}$(Data) is generated, the plaintext data Data stored in the plaintext data holding unit 103 is erased (step S13).

The generated temporary key $S_k$ is transmitted to the external storage device 102 (step S14). Note that master key designation information is also transmitted when a method of designating one or a plurality of master keys from the information processing apparatus 101 side to the external storage device 102 side is employed.

The generated temporary key $S_k$ transmitted in step S14 may be transmitted prior to step S12 or S13.

Upon reception of the temporary key $S_k$ (or both the temporary key $S_k$ and the master key designation information) (step S15), the external storage device 102 encrypts the temporary key $S_k$ with a predetermined master key $M_{ki}$ to generate $E_{Mki}(S_k)$ (step S16), and encrypts the temporary key $S_k$ to generate $E_{Sk}(S_k)$ (step 17).

For example, when master key designation method (1) is employed, the predetermined master key is given all the master keys stored in the master key memory 9. When master key designation method (2) is employed, the predetermined master key is given a master key designated by the master key designation information from the information processing apparatus 101.

The resultant $E_{Mki}(S_k)$ and $E_{Sk}(S_k)$ are transmitted to the information processing apparatus 101 (step S18).

Upon reception of these $E_{Mki}(S_k)$ and $E_{Sk}(S_k)$ (step S19), the encrypted data generator 106 in the information processing apparatus 101 generates encrypted data such as a file or packet in which $E_{Mki}(S_k)$ and $E_{Sk}(S_k)$ are contained in the header portion and $E_{Sk}$(Data) serves as the data portion (step S20).

The encrypted data thus generated is stored in a predetermined storage device or transferred to a desired destination apparatus (decryption-side information processing apparatus) through a network.

To decrypt the encrypted data $E_{Sk}$(Data), $E_{Mki}(S_k)$ must be decrypted to extract a temporary key. Therefore, the data Data can be extracted only when the decryption side has the corresponding master key. For example, when the temporary key $S_k$ is encrypted using $M_{k1}$, $M_{k2}$, and $M_{k3}$, the header portion of the encrypted data contains $E_{Mk1}(S_k)$, $E_{Mk2}(S_k)$, and $E_{Mk3}(S_k)$. When the decryption side has one of the master keys $M_{k1}$, $M_{k2}$, and $M_{k3}$, the plaintext data Data can be obtained. Needless to say, it is very difficult to decrypt a temporary or master key from the information of the header portion.

The decryption side can verify the decrypted temporary key on the basis of the temporary key $E_{Sk}(S_k)$ encrypted by itself contained in the header portion.

In addition, information added to verify the encrypted temporary key is only one temporary key encrypted by itself regardless of the number of master keys capable of decrypting one encrypted data. When temporary keys are encrypted a number of times corresponding to the number of master keys and a temporary key is encrypted by itself, all the master keys can be verified, thereby facilitating the use of a plurality of master keys for identical data.

For example, each pair of temporary keys encrypted once and two times with each master key are stored in each header. At the time of decryption, the two types of temporary keys obtained by encrypting one temporary key once and two times with one master key are determined whether to coincide with each other, thereby verifying the master key. According to this method, however, the size of information of the encrypted temporary keys stored in the header becomes twice that of the number of master keys. However, in encrypting a temporary key with each master key and a temporary key by itself, information corresponding to the number as the number of master keys +1 can be stored in the header, thereby reducing the header size.

A temporary key is generated at least every data. Even if a temporary key of given encrypted data is decrypted, this temporary key cannot decrypt other encrypted data.

The decryption-side information processing system will be described below.

Figure 14:
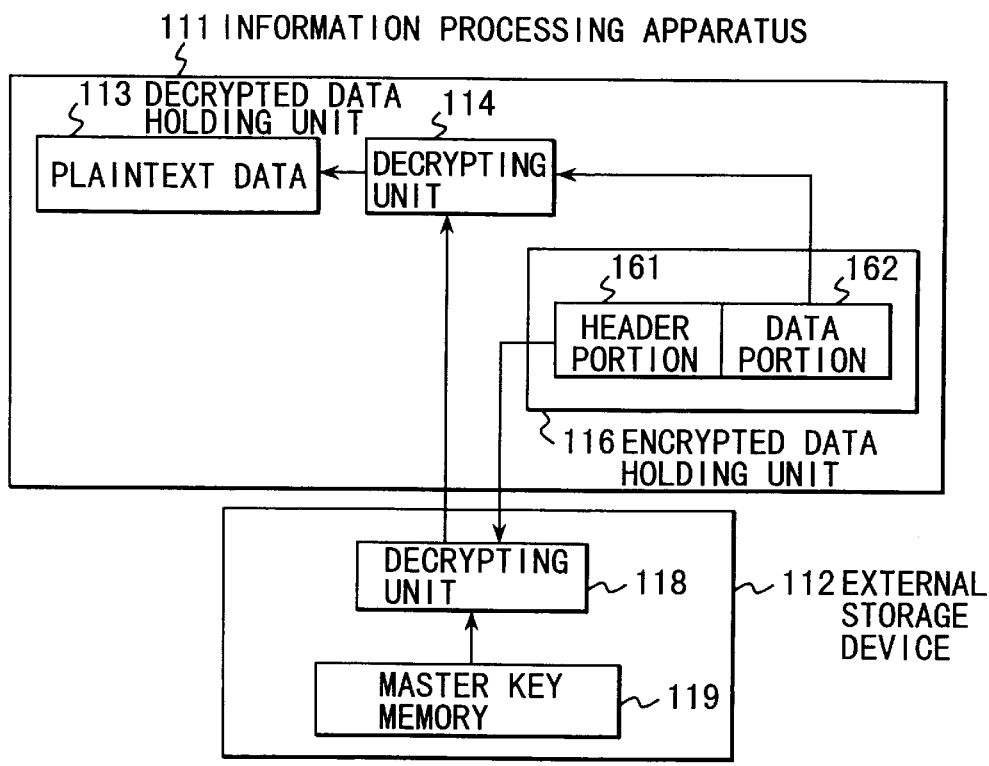
FIG. 14 is a block diagram showing an information processing system (decryption side) according to the third embodiment.

FIG. 14 is a block diagram showing the arrangement of a decryption-side information processing apparatus 111 and a decryption-side external storage device 112 in the information processing system of the third embodiment of the present invention.

The information processing apparatus 111 decrypts data. The information processing apparatus 111 comprises, e.g., a personal computer.

The external storage device 112 stores a master key and decrypts a temporary key. The external storage device 112 comprises, e.g., an IC card having a processing function.

The information processing apparatus 111 and the external storage device 112 exchange data through their interface units (not shown). For example, in operation, the external storage device 112 may be directly connected to a socket of the information processing apparatus 111 or may communicate with the information processing apparatus 111 using an infrared ray or the like.

When the external storage device 112 is not used, the user preferably stores it in a safe place.

As shown in FIG. 14, the information processing apparatus 111 on the data decryption side comprises a encrypted data holding unit 116, a decrypting unit 114, and a decrypted data holding unit 113.

The encrypted data holding unit 116 holds encrypted data serving as a decryption object.

Encrypted data as a decryption object may be read out from a predetermined storage device or obtained through a wire communication line or radio communication channel.

Information of a temporary key encrypted with a master key contained in the header portion of the encrypted data held in the encrypted data holding unit 116 and information of a temporary key encrypted by itself are transferred to the external storage device 112 through the interface units. Note that the entire header portion may be transmitted to the external storage device 112.

Data encrypted with the temporary key contained in the data portion of the encrypted data is transferred to the decrypting unit 114.

By using a temporary key returned from the external storage device 112 through the interface units, the decrypting unit 114 decrypts the data encrypted with the above temporary key.

The decrypted data holding unit 113 holds plaintext data obtained by this decryption.

The decrypted data is displayed on a display device such as a CRT or liquid crystal display, output to an image or audio reproduction device, stored as a file in a storage device such as the built-in hard disk in the information processing apparatus 111 or a removable storage medium such as a floppy disk or CD-ROM, transferred to a file management apparatus through a LAN, or sent in the form of a packet or cell to a desired transfer destination through a wire communication line or radio communication channel.

The external storage device 112 on the temporary key decryption side will be described below.

The temporary storage device 112 has a function of holding master key information and a function of inhibiting output of data of this master key and returning, to the information processing apparatus 111, a temporary key (or a control signal representing decryption inhibition) obtained as a result of decrypting processing therein on the basis of the temporary key information encrypted with a predetermined master key transferred from the information processing apparatus 111.

As shown in FIG. 14, the external storage device 112 on the temporary key decryption side comprises a master key memory 119 and a decrypting unit 118.

The master key memory 119 stores one or a plurality of master keys.

The external read and write accesses to the master key memory 119 are preferably inhibited. However, upon authentication of a password, if access to the master key memory 119 is allowed, the master key information may be added, deleted, or the like.

The decrypting unit 118 receives a temporary key encrypted with a master key and a temporary key encrypted by itself, which are transmitted from the information processing apparatus 111 through the interface units and decrypts the temporary key using the master keys stored in the master key memory 119. In this manner, the temporary key for the plaintext can be obtained, and at the same time the key can be verified.

Figure 15:
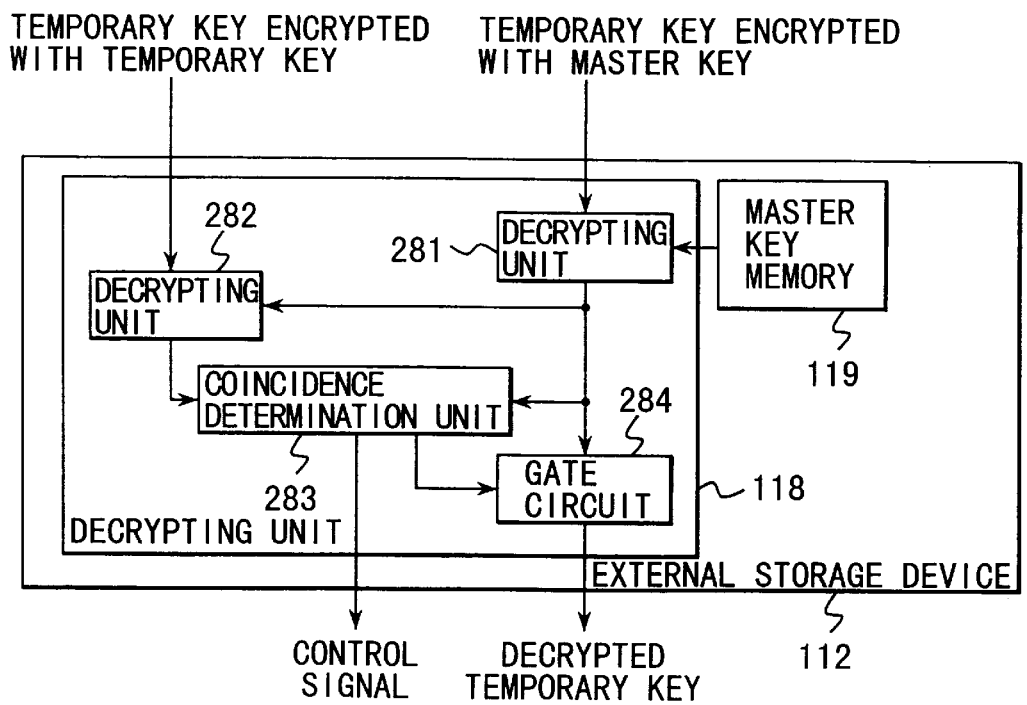
FIG. 15 is a block diagram showing a key determination system for realizing key determination according to the fourth embodiment of the present invention.

FIG. 15 is a block diagram showing the arrangement of a key determination system for realizing key determination according to the fourth embodiment of the present invention.

The temporary key encrypted by one or a plurality of master keys and the temporary key encrypted by itself are transmitted from an information processing apparatus 111 through the interface units. By using the master key stored in a master key memory 119, a decrypting unit 281 decrypts the temporary key encrypted with a master key. Using the decrypted temporary key, a decrypting unit 282 decrypts the temporary key encrypted by itself. A coincidence determination unit 283 determines whether the two decrypted temporary keys coincide with each other. If not, decryption and determination are performed using another master key stored in the master key memory 119, as described above.

If the coincidence determination unit 283 determines that the two decrypted temporary keys coincide with each other, the coincidence determination unit 283 closes a gate circuit 284, and the temporary key is transmitted to the information processing apparatus 111 through the interfaces. In this case, a decrypting unit 114 in the information processing apparatus 111 performs decryption using this temporary key, as described above.

If coincidence determination for the temporary keys using all the master keys stored in master key memory 119 in the external storage device 112 has failed, the encrypted temporary key cannot be decrypted in this external storage device 112. In this case, the coincidence determination unit 283 generates a control signal representing this. The control signal is transmitted from the external storage device 112 to the information processing apparatus 111 through the interface units. In this case, the temporary key is not transmitted to the information processing unit 111, and the encrypted data cannot be decrypted in the information processing apparatus 111.

Note that the decrypting units 281 and 282 may be arranged independently of each other or may be constituted by one decrypting unit which can be used by switching operations.

FIG. 16 is a flow chart showing a key determination operation sequence.

The information processing apparatus 111 transmits to the external storage device 112 $E_{Mki}(S_k)$ and $E_{Sk}(S_k)$ contained in a header portion 161 of the encrypted data stored in the encrypted data holding unit 116 (step S21).

The external storage device 112 receives $E_{Mki}(S_k)$ and $E_{Sk}(S_k)$ (step S22). When the entire header portion 161 is transmitted from the information processing apparatus 111, $E_{Mki}(S_k)$ and $E_{Sk}(S_k)$ are extracted from the header portion 161.

A pair of $E_{Mki}(S_k)$ transferred from the information processing apparatus 111 and the master key $M_{ki}$ stored in the master key memory 119 are selected (step S23).

Using a master key $M_{kj}$, the decrypting unit 281 decrypts the encrypted temporary key $E_{Mki}(S_k)$ to obtain $S_k'=D_{Mkj}(E_{Mki}(S_k))$ (step S24).

Using $S_k'=D_{Mkj}(E_{Mki}(S_k))$, the decrypting unit 282 decrypts $E_{Sk}(S_k)$ encrypted with the master key to obtain $S_k''=D_{Sk'}(E_{Sk}(S_k))$ (step S25).

The coincidence determination unit 283 compares $S_k'$ with $S_k''$. If no coincidence is established (step S26), and a nonselected pair from the pairs of $E_{Mki}(S_k)$ transferred from the information processing apparatus 111 and the master keys $M_{kj}$ stored in the master key memory 119 are present (step S27), the flow returns to step S23.

If the coincidence determination unit 283 compares $S_k'$ with $S_k''$, and a coincidence is established (step S26), the obtained temporary key $S_k$ ($=S_k'=S_k''$) is transmitted to the information processing apparatus 111 (step S28).

Upon reception of the temporary key $S_k$ (step S29), the information processing apparatus 111 decrypts encrypted data $E_{Sk}(Data)$ with the temporary key $S_k$ to extract plaintext data Data (step S30).

Processing in steps S23 to S26 is performed for all the pairs of $E_{Mki}(S_k)$ transferred from the information processing apparatus 111 and the master keys $M_{kj}$ stored in the master key memory 119. If no relation $S_k'=S_k''$ is established for all the pairs (NO in step S26), the external storage device 112 transmits to the information processing apparatus a control information representing that the temporary key cannot be decrypted due to the absence of the master key used in encryption.

Figure 17:
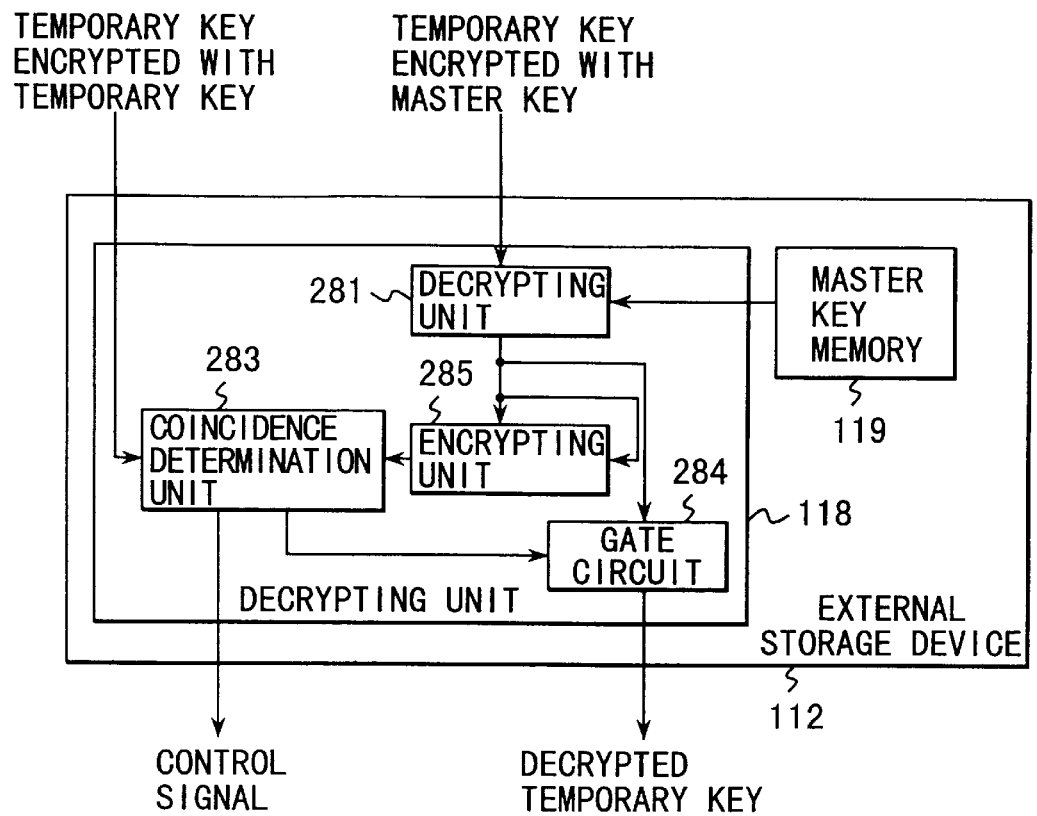
FIG. 17 is a block diagram showing another arrangement of the key determination system.

FIG. 17 shows another arrangement of the key determination system. The arrangement in FIG. 17 is different from that in FIG. 15 in that $E_{Mki}(S_k)$ is decrypted with the master key $M_{kj}$ to obtain $S_k'=D_{Mkj}(E_{Mki}(S_k))$ and this $S_k'$ is encrypted by itself to obtain $E_{Sk'}(S_k')$ to perform verification in accordance with the coincidence between $E_{Mki}(S_k)$ and $E_{Sk'}(S_k')$. The flow chart of this processing sequence is substantially the same as that in FIG. 16 except that $S_k'$ is encrypted with $S_k'$ itself to obtain $E_{Sk'}(S_k')$ in step S25 of FIG. 16 and $E_{Mki}(S_k)$ is compared with $E_{Sk'}(S_k')$ in step S26.

When an encrypting scheme in which processing in the decrypting unit 281 in FIG. 17 becomes identical to that in an encrypting unit 285, the decrypting unit 281 and the encrypting unit 285 may be arranged independently of each other or may be constituted by one circuit which is used by switching operations.

As described above, to decrypt the encrypted data $E_{Sk}$(Data), $E_{Mki}(S_k)$ must be decrypted to extract a temporary key. Therefore, the data Data can be extracted only when the decryption side has the corresponding master key. For example, when the temporary key $S_k$ is encrypted using $M_{k1}$, $M_{k2}$, and $M_{k3}$, the header portion of the encrypted data contains $E_{Mk1}(S_k)$, $E_{Mk2}(S_k)$, and $E_{Mk3}(S_k)$. When the decryption side has one of the master keys $M_{k1}$, $M_{k2}$, and $M_{k3}$, the plaintext data Data can be obtained. Needless to say, it is very difficult to decrypt a temporary or master key from the information of the header portion.

That is, the plaintext data Data is shared by each user having any one of the master keys $M_{k1}$, $M_{k2}$, and $M_{k3}$, thereby keeping privacy of the contents against other users.

The decrypted temporary key is verified on the basis of the temporary key $E_{Sk}(S_k)$ encrypted by the temporary key itself contained in the header portion. If no temporary key is verified, decryption cannot be executed. A trouble such as destruction of encrypted data using a wrong key can be prevented.

In addition, inhibition information for the above verification is advantageously only one temporary key encrypted by itself regardless of the number of master keys capable of decrypting one encrypted data.

According to the embodiment described above, encryption and decryption of a temporary key is performed outside the information processing apparatus. For this reason, the master key can be separate from the information processing apparatus, and the master key can be handled safely. For example, even if the third party illegally accesses the information processing apparatus, the master key cannot be stolen because the master key is not present in the information processing apparatus.

Data is encrypted or decrypted using a temporary key generated every encryption. Even if a temporary key for given encrypted data is decrypted, this temporary key cannot decrypt other encrypted data.

When only a master key changes without changing a temporary key for encrypting data, a temporary key encrypted with a desired master key may be added to the header portion, or the temporary key encrypted with this master key may be deleted from the header portion. Therefore, data need not be encrypted again.

When an arbitrary encrypting scheme is used, an encrypting scheme identifier is added to the header portion of encrypted data. Any encrypting scheme can be freely selected.

When the encryption-side external storage device 102 having the processing function and the decryptionside external storage device 112 having the processing function are shared by one external storage device, a master key used in encryption may be the same as a master key used in decryption. Alternatively, a master key memory usable in only encryption and a master key memory usable in only decryption may be arranged, and desired master keys may be stored in these memories, respectively.

Application examples of the information processing system according to this embodiment will be described below. For example, a plurality of information processing apparatuses having both the encryption and decryption functions are connected to a LAN or the like. It is assumed that a file management apparatus for accumulating and managing files is connected to this LAN. The user of each information processing apparatus creates a file containing encrypted data by using the external storage device with the processing function in which the master key is stored as described above. The user then stores the created file in the file management apparatus through the LAN. In this case, when a temporary key encrypted with a desired user's master key is added to the header of this file, the encrypted file can be decrypted by any authentic user. In this manner, a system which safely shares the encrypted files can be constructed.

The present invention is also applicable to a case in which one stand-alone information processing apparatus is shared by a plurality of users, and files stored in the built-in hard disk drive in this information processing apparatus are shared by the plurality of users.

A desired public key encrypting scheme such as RSA may be used for at least one of a scheme for encrypting data serving as an encryption object and a scheme for encrypting a temporary key. For example, when a desired public key encrypting scheme is used for a scheme for encrypting a temporary key, the public key of authentic users is used as a master key in encryption. At the time of decryption, each user use a secret key of his own as a master key. For example, when an encrypting scheme using different encryption and decryption keys is used for a scheme for encrypting data serving as an encryption object, a pair of encryption and decryption keys are generated as temporary keys, data is encrypted using the encryption key, the decryption key is encrypted, and the encrypted keys are stored in the header portion.

If an external storage device which stores a master key is not used, a master key is generated and used as follows. A password or ID number is input to an information processing apparatus for encryption and decryption to prepare a master key generator for generating encryption and decryption master keys using a one-directional function or the like. Upon reception of personal/group passwords/ID numbers, the master key generator generates different master keys for these inputs. These master keys are used in an encrypting device to encrypt a temporary key and in a decrypting device to decrypt a temporary key.

These arrangements can be realized by hardware wired arrangements or by software upon running corresponding programs on a CPU.

The present invention is not limited to the particular embodiments described above. Various changes and modifications may be made within the technical scope of the invention.

According to the third and fourth embodiments, a temporary key encrypted with a predetermined master key and a temporary key encrypted by itself are added to data encrypted with a predetermined temporary key. The key can be verified and the encrypted data can be decrypted by an authentic user having the corresponding master key. Privacy of the contents can be kept against other users.

Since decryption is performed while verifying the key using the temporary key encrypted by itself, data destruction caused by use of a wrong master key can be prevented in decryption. In addition, by adding to the header portion the temporary key encrypted by itself, all the master keys can be verified.

For example, data shared by a plurality of users such as individual users or a group can be safely stored in the encrypted form.

Encryption and decryption of a temporary key are performed outside the information processing apparatus. For this reason, the master key can be separate from the information processing apparatus, and the master key can be handled safely. For example, even if the third party illegally accesses the information processing apparatus, the master key cannot be stolen because the master key is not present in the information processing apparatus.

Figure 18:
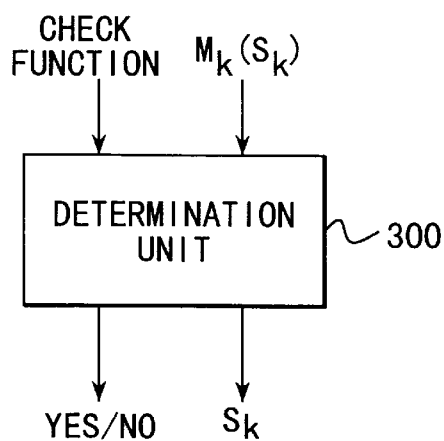
FIG. 18 is a block diagram showing the arrangement of a key determination system when a key determination method is generalized according to the fifth embodiment of the present invention.

FIG. 18 is a block diagram showing the arrangement of a key determination system using a generalized key determination method according to the fifth embodiment of the present invention. In the key determination system according to the fifth embodiment, data obtained by encrypting a temporary key $S_k$ with a master key $M_k$ is input as $M_k(S_k)$. At the same time, an arbitrary one of a plurality of check functions (to be described later) is selectively input as check data. A determination unit 300 performs predetermined encryption and/or decryption using a master key on the basis of these two input data, determines whether the master key is correct, outputs a determination result (YES/NO), and outputs the decrypted temporary key $S_k$.

FIG. 19 shows a table of a plurality of classified check functions which can be input to the key determination system. A check function X(a) represents data obtained by encrypting a key a with a key X. A check function $X^{-1}(a)$ represents data obtained by decrypting the key a with the key X. A check function $X^2(a)$ represents data obtained by encrypting the key a with the key X two times. Reference symbol h represents a hash function; ||, a two-key array; +, addition; $\overline{d}$, data shared by a plurality of users; and $\overline{d}$, time-variant shared data which is changed per encryption or decryption.

The check functions used in encrypting or decrypting $M_k$ will be described first.

If a check function contains both $M_k$ and $S_k$, then $S_k(M_K)$ and $S_k^{-1}$ are present; otherwise, $h(M_k\|S_k)$ is present. If a check function contains either $M_k$ or $\overline{M}_k$ and other data, $M_k(M_K)$, $M_k^{-1}(M_k)$, $M_k(M_k+\overline{d})$, and $M_k^{-1}(M_k+\overline{d})$ can be present; otherwise, $M_k(\overline{d})$, $M_k^{-1}(\overline{d})$, and $h(M_k)$ can be present. No check function containing only $S_k$ or $\overline{S}_k$ and other data is present.

The check functions used for encrypting or decrypting $S_k$ will be described below.

If a check function contains both $M_k$ and $S_k$, then $M_k^2(S_k)$ and $M_k^{-1}(S_k)$ are present; otherwise, $h(M_k\|S_k)$ is present. No check function containing either $M_k$ or $\overline{M}_k$ and other data is present. If a check function contains only $S_k$ or $\overline{S}_k$ and other data, $S_k(S_k)$ and $S_k^{-1}(S_k)$ can be present; otherwise, $S_k(d)$, $S_k^{-1}(d)$, and $h(S_k)$ can be present.

FIG. 20 is a block diagram showing the arrangement of a key determination system when $S_k(M_k)$ is input as a check function. This key determination system comprises a decrypting circuit 301, an encrypting circuit 302, a coincidence determination unit 303, and a gate 304. The operations of the decrypting circuit 301, the encrypting circuit 302, the coincidence determination unit 303, and the gate 304 are the same as those described above. An arrow indicates an input of the master key Mk. The gate 304 is used to control whether data is output. Such a description also applies to check functions to be described below.

FIG. 21 is a block diagram showing the arrangement of a key determination system when $S_k^{-1}(M_k)$ is input as a check function. This system comprises decrypting circuits 305 and 306, a coincidence determination unit 307, and a gate 308.

FIG. 22 is a block diagram showing the arrangement of a key determination system when $M_k(M_k)$ is input as a check function. This system comprises a decrypting circuit 309, a coincidence determination unit 310, an encrypting circuit 311, and a gate 312.

Figure 23:
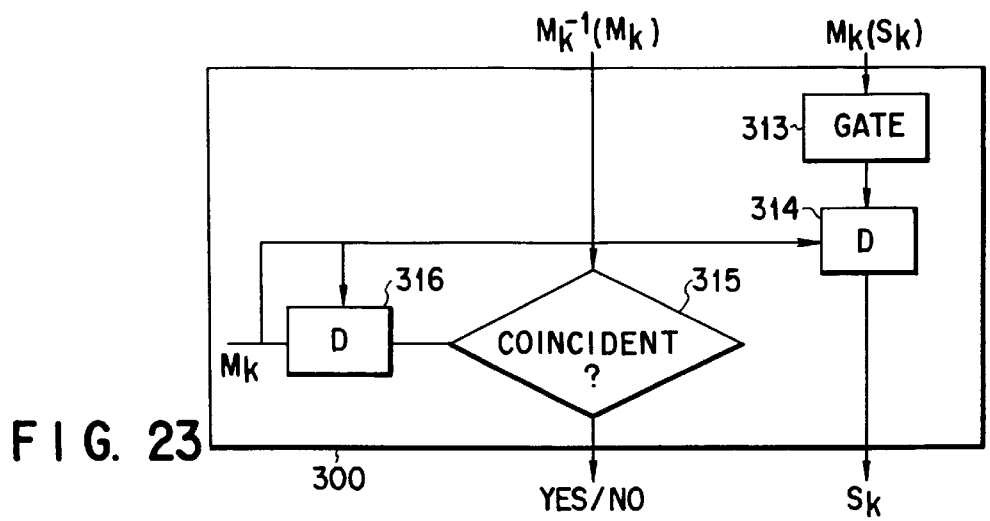
FIG. 23 is a block diagram showing the arrangement of the key determination system when $M_k^{-1}(M_k)$ is input as a check function.

FIG. 23 is a block diagram showing the arrangement of a key determination system when $M_k^{-1}(M_k)$ is input as a check function. This system comprises a gate 313, a decrypting circuit 314, a coincidence determination unit 315, and a decrypting circuit 316.

Figure 24:
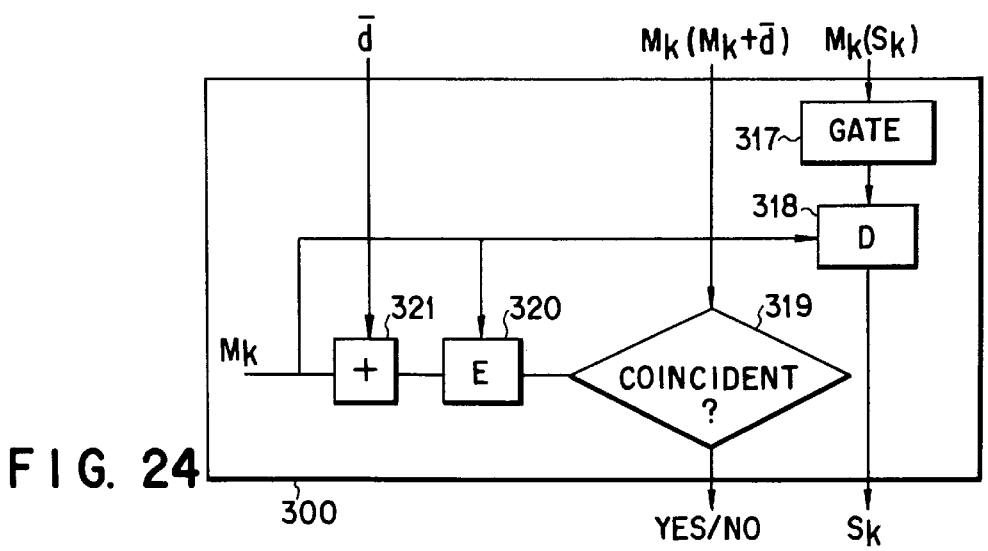
FIG. 24 is a block diagram showing the arrangement of the key determination system when $\overline{d}$ and $M_k(M_k+\overline{d})$ are input as check functions.

FIG. 24 is a block diagram showing the arrangement of a key determination system when $\overline{d}$ and $M_k(M_k+\overline{d})$ are input as check functions. This system comprises a gate 317, a decrypting circuit 318, a coincidence determination unit 319, an encrypting circuit 320, and an adder 321.

Figure 25:
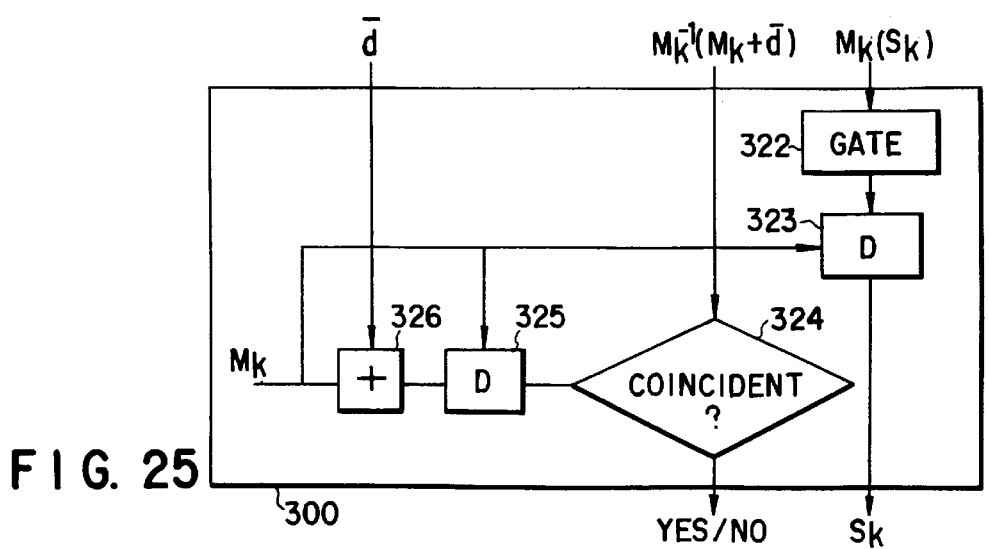
FIG. 25 is a block diagram showing the arrangement of the key determination system when $\overline{d}$ and $M_k^{-1}(M_k+\overline{d})$ are input as check functions.

FIG. 25 is a block diagram showing the arrangement of a key determination system when $\overline{d}$ and $M_k^{-1}(Mk+d)$ are input as check functions. This system comprises a gate 322, a decrypting circuit 323, a coincidence determination unit 324, a decrypting circuit 325, and an adder 326.

FIG. 26 is a block diagram showing the arrangement of a key determination system when $h(M_k\|S_k)$ is input. This system comprises a decrypting circuit 327, a coupling unit 328, a hash function (h) 329, a gate 330, and a coincidence determination unit 331.

FIG. 27 is a block diagram showing the arrangement of a key determination system when $\overline{d}$ and $M_k(\overline{d})$ are input as check functions. This system comprises a decrypting circuit 332, a coincidence determination unit 333, a gate 334, and a decrypting circuit 335.

FIG. 28 is a block diagram showing the arrangement of a key determination system when $\overline{d}$ and $M_k^{-1}(\overline{d})$ are input as check functions. This system comprises a decrypting circuit 336, a coincidence determination unit 337, a gate 338, and a decrypting circuit 339.

FIG. 29 is a block diagram showing the arrangement of a key determination system when $h(M_k)$ is input as a check function. This system comprises a coincidence determination unit 340, a hash function (h) 341, a gate 342, and a decrypting circuit 343.

FIG. 30 is a block diagram showing the arrangement of a key determination system when $M_k^2(S_k)$ is input as a check function. This system comprises a decrypting circuit 344, an encrypting circuit 345, a gate 347, and a coincidence determination unit 346.

FIG. 31 is a block diagram showing the arrangement of a key determination system when $M_k^{-1}(S_k)$ is input as a check function. This system comprises a decrypting circuit 348, a coincidence determination unit 349, and an encrypting circuit 350.

Figure 32A:
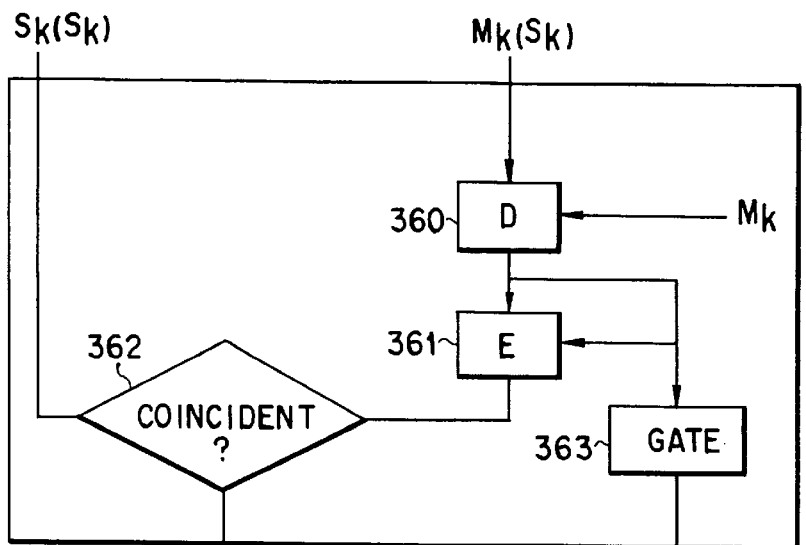
FIGS. 32A and 32B are block diagrams showing the arrangements of the key determination system when $S_k(S_k)$ is input as a check function.
Figure 32B:
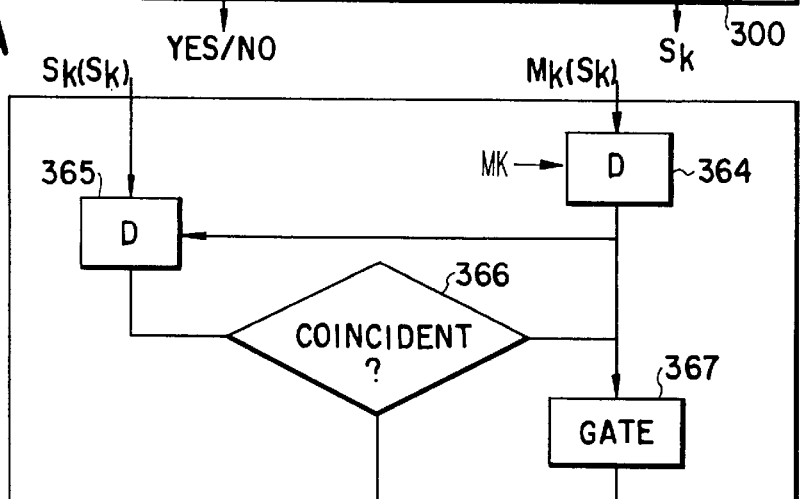

FIGS. 32A and 32B are block diagrams showing the arrangements of key determination systems when $S_k(S_k)$ is input as a check function. The system shown in FIG. 32A comprises a decrypting circuit 360, an encrypting circuit 361, a coincidence determination unit 362, and a gate 363. The system shown in FIG. 32B comprises decrypting circuits 364 and 365, a coincidence determination circuit 366, and a gate 367.

Figure 33A:
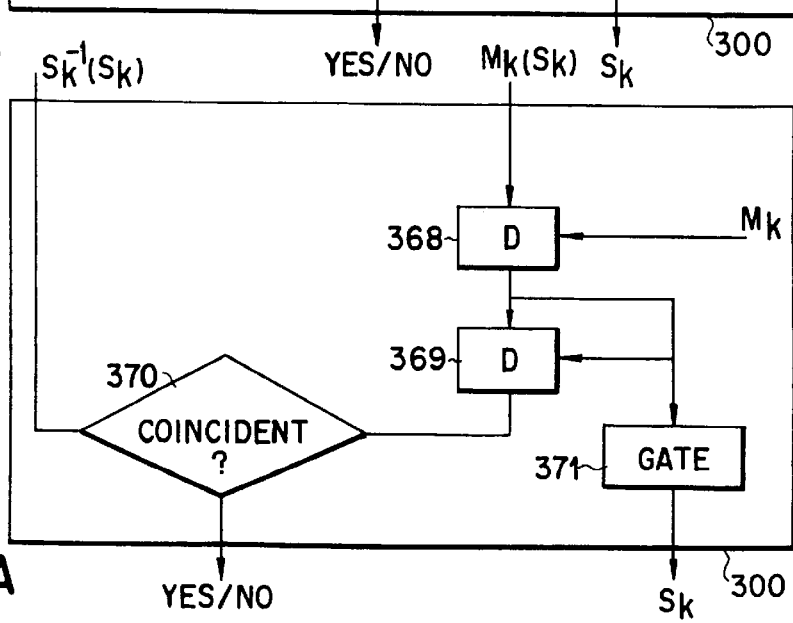

FIGS. 33A and 33B are block diagrams showing the arrangements of key determination systems when $S_k^{-1}(S_k)$ is input as a check function. The system shown in FIG. 33A comprises decrypting circuits 368 and 369, a coincidence determination unit 370, and a gate 371. The system in FIG. 33B comprises a decrypting circuit 372, an encrypting circuit 373, a coincidence determination unit 374, and a gate 375.

FIG. 34 is a block diagram showing the arrangement of a key determination system when d and $S_k(d)$ are input as check functions. This system comprises decrypting circuits 376 and 377, a coincidence determination circuit 378, and a gate 379.

FIG. 35 is a block diagram showing the arrangement of a key determination system when d and $S_k^{-1}(d)$ are input as check functions. This system comprises a decrypting circuit 380, an encrypting circuit 381, a coincidence determination unit 382, and a gate 383.

FIG. 36 is a block diagram showing the arrangement of a key determination system when $h(S_k)$ is input as a check function. This system comprises a decrypting circuit 384, a hash function (h) 385, a coincidence determination unit 386, and a gate 387.

FIG. 37 is a block diagram showing an application example when the key determination system of the fifth embodiment is applied to a DVD (Digital Video Disk).

The transmitting side encrypts the temporary key $S_k$ with different keys $M_{k1}$ to $M_{kn}$ input to a plurality of encrypting circuits 500-1 to 500-n. At this time, data obtained by encrypting the temporary key $S_k$ by itself is also transmitted.

On the receiving side, the mask keys $M_{k1}$ to $M_{kn}$ used in transmission are input to a plurality of decrypting circuits 501-1 to 501-n to obtain $S_k$. At this time, for example, when decrypting is performed in the decrypting circuit 501-3 using a master key $M_{k3}'$ different from $M_{k3}$, a temporary key $S_k'$ different from $S_k$ is obtained. Even if a comparator 503 compares $S_k'(S_k')$ obtained by encrypting with $S_k'$ with $S_k(S_k)$ transmitted from the transmitting side, no coincidence is established. The temporary key $S_k$ is output to cause an error. In this manner, the truth/false of the master key can be determined.

Figure 38:
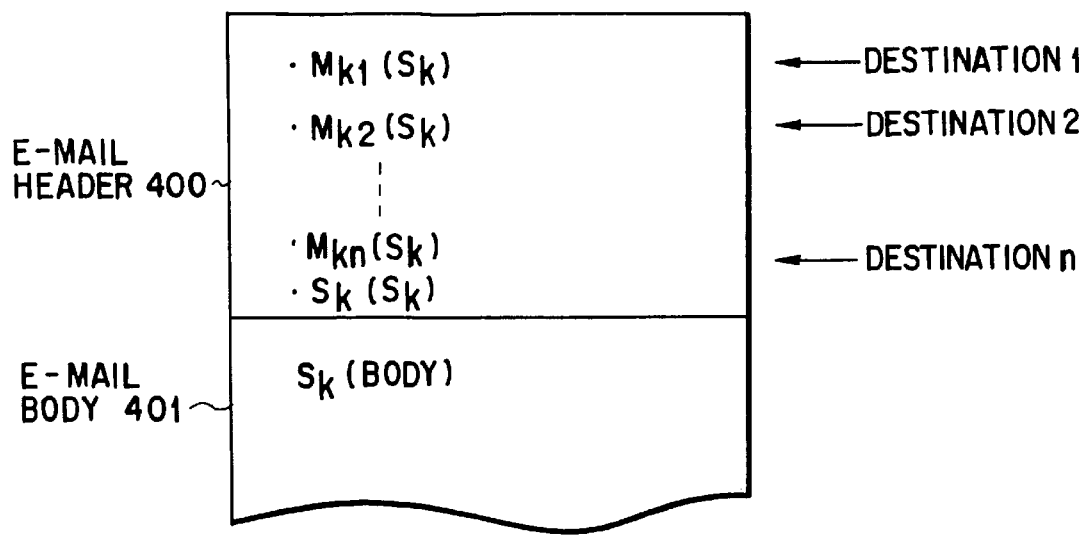
FIG. 38 is a view for explaining the second application example of the key determination system according to the fifth embodiment.

FIG. 38 is a view showing an application example when the key determination system of the fifth embodiment is applied to an E-mail.

Data $M_{k1}(S_k)$ to $M_{kn}(S_k)$ obtained by encrypting the temporary key $S_k$ with a plurality of different master keys $M_{k1}$ to $M_{kn}$, and $S_k(S_k)$ encrypted by itself are recorded on a header 400 of the E-mail. $S_k$(body) is recorded on a body 401. The recorded data are transmitted to destinations 1 to n corresponding to $M_{k1}$ to $M_{kn}$ by broadcasting. In this case, destination 1 as the receiving side decrypts to extract $S_k$ using $M_{k1}$ of its own. The extracted $S_k$ is decrypted using the same $M_{k1}$, and the decrypted $S_k$ is then compared with the received $S_k(S_k)$. If a coincidence is established, $S_k$ can be obtained, and decryption is performed using this $S_k$ to obtain the body.

Even if the third party illegally decrypts $S_k$ with its own master key, a comparison result represents an incoincidence. The temporary key $S_k$ cannot be correctly decrypted, and the body cannot be obtained.

Figure 39:
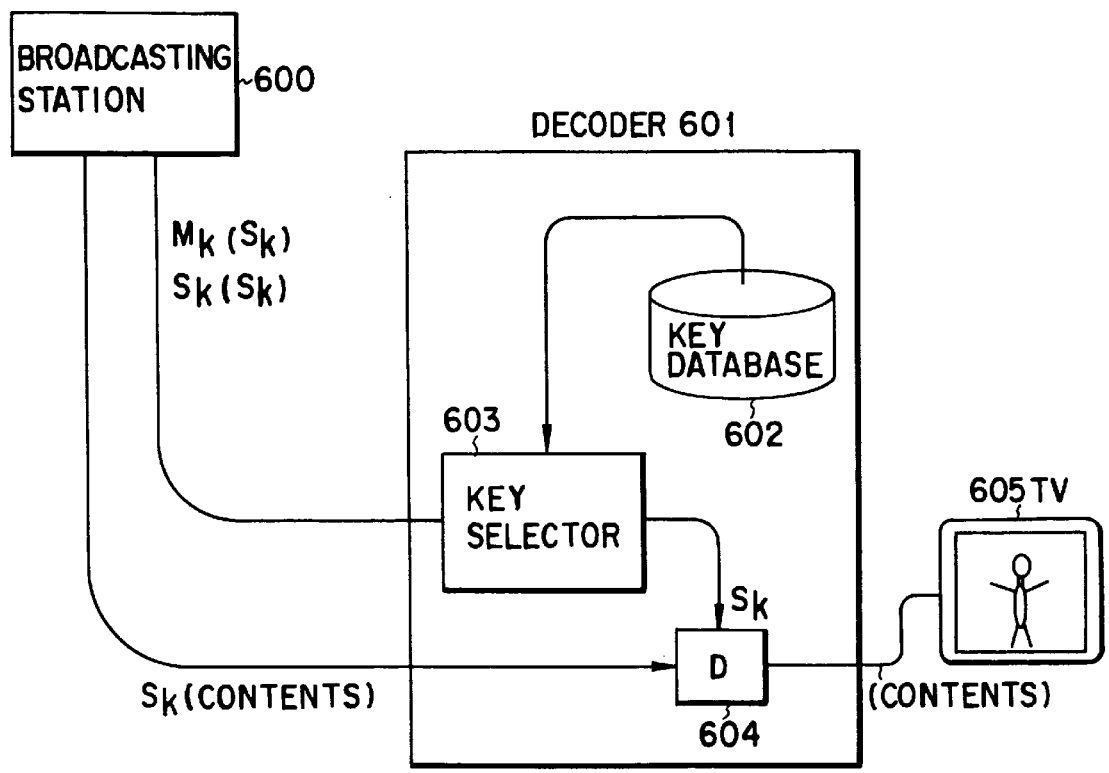
FIG. 39 is a view for explaining the third application example of the key determination system according to the fifth embodiment.

FIG. 39 is a view for explaining examples in which the key determination system of the fifth embodiment is applied to a CATV.

According to the first example, the receiving side has a key database. Assume that a broadcasting station 600 sends broadcasting contents to a receiving station in a specific area. In this case, the broadcasting station 600 sends data $S_k$(contents) obtained by encrypting the broadcasting contents with $S_k$, data $M_k(S_k)$ obtained by encrypting $S_k$ with $M_k$, and data $S_k(S_k)$ obtained by encrypting $S_k$ by itself. A decoder 601 in the receiving station has a key database 602 having a plurality of keys. A key selector 603 selects a key coinciding with the received $M_k$ from the key database 602. Decryption is performed using the selected key to obtain $S_k$. Data obtained by encrypting this $S_k$ by itself is compared with the sent $S_k(S_k)$. If a coincidence is established, the comparison result is output to a decrypting circuit 604. The decrypting circuit 604 decrypts the received $S_k$(contents) using this $S_k$ to extract the contents. The contents are then displayed on the screen of a TV 605. Even if the third party illegally decrypts the key with its own master key, a comparison result represents an incoincidence, and $S_k$ cannot be correctly decrypted. Therefore, the third party cannot watch the broadcasting contents.

In the above arrangement, for example, when a key used prior to a move and a key used after the move are stored in the key database 602, the correct key can be selected even after the move. Therefore, the contents can be normally decrypted without changing the arrangement of the decoder 601.

The second example will be described below. The basic arrangement of the second example is identical to that of the first example, except that both the broadcasting station 600 serving as a transmitting side and the receiving station have databases. The broadcasting station 600 selects one of the keys from the key database and transmits the selected key. The decoder 601 in the receiving station selects a corresponding one of the keys from the key database 602 and decrypts the received key. In this case, the keys $M_k$ and $S_k$ transmitted from the broadcasting station 600 are changed every transmission cycle. In addition, the broadcasting station 600 does not send information about this change to the receiving station. In addition to the effect of the first example, this further improves the safety.

The third example will be described below. The basic arrangement of the third example is identical to that of the first example. In this case, the receiving station has a key database.

To cope with a change to a new key upon leaking the current key, a change from the current key version to a new version, keys of current and new versions are stored in the key database 602 in advance. With this arrangement, even if a new key upon a change from the current key is sent from the broadcasting station, the key can be normally decrypted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An information processing system comprising a first information processing apparatus and a second information processing apparatus arranged separate from said first information processing apparatus and capable of exchanging a signal with said first information processing apparatus, wherein said first information processing apparatus comprises first key generation means for generating a first key, and first encryption means for encrypting data using the first key generated by said first key generation means to generate first encrypted information;

said second information processing apparatus comprises second key storage means for storing a second key, and second encryption means for encrypting the first key using the second key stored in said second key storage means to generate second encrypted information; and said first information processing apparatus further comprises correlation storage means for storing the first encrypted information generated by said first encryption means and the second encrypted information generated by said second encryption means, the first encrypted information being correlated with the second encrypted information.

2. A system according to claim 1, wherein said first encryption means comprises means for deleting the data after the first encrypted information is generated.

3. A system according to claim 1, wherein said second key storage means stores a plurality of second keys, and said first information processing apparatus comprises designation means for selecting, from the plurality of second keys, a second key used to encrypt the first key, and designating the selected second key to said second information processing apparatus.

4. An information processing system comprising a first information processing apparatus and a second information processing apparatus arranged separate from said first information processing apparatus and capable of exchanging a signal with said first information processing apparatus, wherein said first information processing apparatus comprises correlation storage means for storing first encrypted information obtained by encrypting data with a first key and second encrypted information obtained by encrypting the first key with a second key, the first encrypted information being correlated with the second encrypted information;

said second information processing apparatus comprises second key storage means for storing the second key, and first decryption means for decrypting the second encrypted information from said correlation storage means by using the second key stored in said second key storage means, thereby extracting the first key; and said first information processing apparatus further comprises second decryption means for decrypting the first encrypted information from said correlation storage means by using the first key extracted by said first decryption means, thereby obtaining the data.

5. An information processing apparatus comprising:

first key generation means for generating a first key;

encryption means for encrypting data with the first key generated by said first key generation means;

input means for outputting the first key generated by said first key generation means to an external information processing apparatus and inputting, in said external information processing apparatus, the first key encrypted with a second key stored in said external information processing apparatus; and storage means for storing the encrypted first key input through said input means and the data encrypted by said encryption means, the encrypted first key being correlated with the encrypted data.

6. An information processing apparatus according to claim 5, wherein said encryption means comprises means for deleting the data after the data is encrypted.

7. An information processing apparatus according to claim 5, further comprising designation means for selecting, from the plurality of second keys, a second key used to encrypt the first key, and designating the selected second key to said external information processing apparatus.

8. An information processing apparatus comprising:

storage means for storing first encrypted information obtained by encrypting data with a first key and second encrypted information obtained by encrypting the first key with a second key;

input means for outputting the second encrypted information from said storage means to an external information processing apparatus, and inputting a decrypted first key obtained by decrypting, in said external information processing apparatus, the second encrypted information with the second key stored in said external information processing apparatus; and decryption means for decrypting the first encrypted information with the decrypted first key input through said input means, thereby obtaining the data.

9. An information processing apparatus comprising:

storage means for storing a second key;

input means for inputting the first key from an external information processing apparatus which encrypts data with the first key;

encryption means for encrypting the first key input through said input means, by using the second key stored in said storage means; and output means for outputting the encrypted first key to said external information processing apparatus so as to store the first key encrypted by said encryption means and the encrypted data in correlation with the encrypted first key in said external information processing apparatus.

10. An information processing apparatus according to claim 9, wherein said storage means stores a plurality of second keys, and said encryption means comprises means for encrypting the first key with one of the plurality of second keys which is designated by said external information processing apparatus.

11. An information processing apparatus comprising:

second key storage means for storing a second key;

input means for inputting second encrypted information from an external information processing apparatus having storage means for storing first encrypted information obtained by encrypting data with a first key and the second encrypted information obtained by encrypting the first key with the second key stored in said second key storage means;

decryption means for decrypting with the second key the second encrypted information input through said input means to extract the first key; and output means for outputting the extracted first key to said external information processing apparatus in order to decrypt the first encrypted information with the first key extracted by said decryption means to obtain the data.

12. An information processing method comprising:

the first key generation step of generating a first key in a first information processing apparatus;

the first encrypted information generation step of encrypting data using the generated first key to generate first encrypted information;

the output step of outputting the first key to a second information processing apparatus which is arranged separate from said first information processing apparatus and stores a second key;

the second encrypted information generation step of encrypting the first key using the second key in said second information processing apparatus to generate second encrypted information;

the output step of outputting the generated second encrypted information to said first information processing apparatus; and the storage step of storing the first encrypted information and the second encrypted information in correlation with the first encrypted information in said first information processing apparatus.

13. An information processing method comprising:

the output step of outputting second encrypted information from a first information processing apparatus to a second information processing apparatus separate from said first information processing apparatus, said first information processing apparatus storing first encrypted information obtained by encrypting data with a first key and the second encrypted information obtained by encrypting the first key with a second key, and the first encrypted information being correlated with the second encrypted information;

the first key extraction step of decrypting the second encrypted information with the second key stored in said second information processing apparatus in advance to extract the first key;

the output step of outputting the extracted first key to said first information processing apparatus; and the data acquisition step of decrypting the first encrypted information with the first key in said first information processing apparatus to obtain the data.

14. An information processing method comprising:

the first key generation step of generating a first key;

the encryption step of encrypting data with the generated first key;

the output step of outputting the generated first key to an external information processing apparatus;

the input step of inputting, in said external information processing apparatus, the first key encrypted with the second key stored in said external information processing apparatus; and the storage step of storing the input encrypted first key and data encrypted with the first key, the encrypted first key being correlated with the encrypted data.

15. An information processing method comprising:

the output step of outputting, to an external information processing apparatus, second encrypted information of first encrypted information stored and obtained by encrypting data with a first key and the second encrypted information stored and obtained by encrypting the first key with a second key;

the input step of inputting, in said external information processing apparatus, the first key obtained by decrypting the second encrypted information with the second key stored in said external information processing apparatus; and the extraction step of decrypting the first encrypted information with the input first key to extract the data.

16. An information processing method comprising:

the input step of inputting a generated first key from an external information processing apparatus which encrypts data with the first key;

the encryption step of encrypting the input first key with a second key stored in advance; and the output step of outputting the encrypted first key to said external information processing apparatus in order to store the encrypted first key and the encrypted data in correlation with the encrypted first key in said external information processing apparatus.

17. An information processing method comprising:

the input step of inputting second encrypted information form an external information processing apparatus having storage means for storing first encrypted information obtained by encrypting data with a first key and the second encrypted information obtained by encrypting the first key with a second key;

the extraction step of decrypting the second encrypted information with the second key stored in advance to extract the first key; and the output step of outputting the decrypted extracted first key to said external information processing apparatus in order to decrypt the first encrypted information with the extracted first key to obtain the data in said external information processing apparatus.

18. A program storage device which stores a program readable from a machine in order to execute method steps for performing encryption processing, wherein the method steps comprise:

the first key generation step of generating a first key;

the encryption step of encrypting data with the generated first key;

the output step of outputting the generated first key to an external information processing apparatus;

the input step of inputting, in said external information processing apparatus, the first key encrypted with a second key stored in said external information processing apparatus; and the storage step of storing the encrypted input first key and the data encrypted with the first key, the encrypted input first key being correlated with the data encrypted with the first key.

19. A program storage device which stores a program readable from a machine in order to execute method steps for performing encryption processing, wherein the method steps comprise:

the output step of outputting, to an external information processing apparatus, second encrypted information of first encrypted information stored and obtained by encrypting data with a first key and the second encrypted information stored and obtained by encrypting the first key with a second key;

the input step of inputting, in said external information processing apparatus, the first key obtained by decrypting the second encrypted information with the second key stored in said external information processing apparatus; and the extraction step of decrypting the first encrypted information with the input first key to extract the data.

20. A key determination method for determining, at a receiving side, which one of a plurality of first data received from a transmitting side has been obtained by encrypting/decrypting a first key using a second key corresponding to a specific key of the receiving side, the method comprising steps of:

inputting the plurality of first data, each first data having been obtained at the transmitting side by encrypting/decrypting the first key using each one of a plurality of second keys, the plurality of second keys including the second key corresponding to the specific key of the receiving side;

inputting second data from the transmitting side, the second data having been obtained at the transmitting side by executing a first processing on at least one of the first key and the second key;

executing a second processing including the first processing on the plurality of first data, the second data, and the specific key of the receiving side, to determine which one of the plurality of first data has been obtained by encrypting/decrypting the first key using the second key corresponding to the specific key of the receiving side; and outputting the first key obtained from the determined one of the plurality of first data by using the specific key.

21. A key determination method for determining, at a receiving side, which one of a plurality of second keys of the receiving side corresponds to a specific key of the transmitting side, the specific key having been used in obtaining first data at a transmitting side to encrypt/decrypt a first key, the method comprising steps of:

inputting the first data from the transmitting side, the first data having been obtained at the transmitting side by encrypting/decrypting the first key using the specific key of the transmitting side;

inputting second data from the transmitting side, the second data having been obtained at the transmitting side by executing a first processing on at least one of the first key and the specific key;

executing a second processing including the first processing on the first data, the second data, and the plurality of second keys of the receiving side, to determine which one of the plurality of second keys corresponds to the specific key of the transmitting side used in obtaining the first data; and outputting the first key obtained from the first data by using the determined one of the plurality of second keys.

22. The method according to claim 21, wherein the specific key of the transmitting side is identical to one of the plurality of the specific keys of the receiving side, and the first data have been obtained at the transmitting side by using said one of the plurality of the specific keys.

23. A key determination method for determining, at a receiving side, which one of a plurality of first data received from a transmitting side has been obtained by encrypting/decrypting a first key using a specific second key, the method comprising steps of:

inputting the plurality of first data, each first data having been obtained at the transmitting side by encrypting/decrypting the first key using each one of a plurality of second keys, the plurality of second keys including the specific second key;

inputting second data from the transmitting side, the second data having been obtained at the transmitting side by encrypting/decrypting the first key using the first key;

executing a processing on the plurality of first data and the second data using the specific key to determine which one of the plurality of first data has been obtained by encrypting/decrypting the first key using the specific second key; and outputting the first key obtained by the processing using the specific second key from the determined one of the plurality of first data.

24. A key determination apparatus for determining, at a receiving side, which one of a plurality of first data received from a transmitting side has been obtained by encrypting/decrypting a first key using a second key corresponding to a specific key of the receiving side, the apparatus comprising:

first input means for inputting the plurality of first data, each first data having been obtained at the transmitting side by encrypting/decrypting the first key using each one of a plurality of second keys, the plurality of second keys including the second key corresponding to the specific key of the receiving side;

second input means for inputting second data from the transmitting side, the second data having been obtained at the transmitting side by executing a first processing on at least one of the first key and the second key;

execution means for executing a second processing including the first processing on the plurality of first data, the second data, and the specific key of the receiving side, to determine which one of the plurality of first data has been obtained by encrypting/decrypting the first key using the second key corresponding to the specific key of the receiving side; and output means for outputting the first key obtained from the determined one of the plurality of first data by using the specific key.

25. A key determination apparatus according to claim 24, wherein the second input means inputs, as the second data, at least one of data A generated at the transmitting side on the basis of the first and second keys, data B generated at the transmitting side on the basis of only the first key, data C generated at the transmitting side on the basis of only the second key, and data D generated at the transmitting side using neither the first key nor the second key.

26. A key determination apparatus according to claim 25, wherein the data A is one of data obtained by encrypting the second key with the first key, data obtained by decrypting the second key with the first key, data obtained by encrypting the first key twice with the second key, and data obtained by decrypting the first key with the second key.

27. A key determination apparatus according to claim 25, wherein the data B is one of data obtained by encrypting the first key with the first key itself, data obtained by decrypting the first key with the first key itself, data obtained by encrypting predetermined shared data with the first key, data obtained by decrypting the predetermined shared data with the first key, and data obtained by encrypting the first key with a specific function.

28. A key determination apparatus according to claim 25, wherein the data C is one of data obtained by encrypting the second key with the second key itself, data obtained by decrypting the second key with the second key itself, data obtained by encrypting with the second key a sum of the second key and shared data changing every encryption, data obtained by decrypting with the second key the sum of the second key and shared data changing every encryption, data obtained by encrypting with the second key shared data changing every encryption, data obtained by decrypting with the second key the shared data changing every encryption, and data obtained by encrypting the second key with a specific function.

29. A key determination apparatus according to claim 25, wherein the data D is obtained by encrypting with the specific function data in which the first and second keys are juxtaposed.

30. A key determination apparatus for determining, at a receiving side, which one of a plurality of second keys of the receiving side corresponds to a specific key of the transmitting side, the specific key having been used in obtaining first data at a transmitting side to encrypt/decrypt a first key, the apparatus comprising:

first input means for inputting the first data from the transmitting side, the second having been obtained at the transmitting side by encrypting/decrypting the first key using the specific key of the transmitting side;

second input means for inputting second data from the transmitting side, the second data having been obtained at the transmitting side by executing a first processing on at least one of the first key and the specific key;

execution means for executing a second processing including the first processing on the first data, the second data, and the plurality of second keys of the receiving side, to determine which one of the plurality of second keys corresponds to the specific key of the transmitting side used in obtaining the first data; and output means for outputting the first key obtained from the first data by using the determined one of the plurality of second keys.

31. A key determination apparatus according to claim 30, wherein the second input means inputs, as the second data, at least one of data A generated at the transmitting side on the basis of the first and specific keys, data B generated at the transmitting side on the basis of only the first key, data C generated at the transmitting side on the basis of only the specific key, and data D generated at the transmitting side using neither the first key nor the specific key.

32. A key determination apparatus according to claim 31, wherein the data A is one of data obtained by encrypting the specific key with the first key, data obtained by decrypting the specific key with the first key, data obtained by encrypting the first key twice with the specific key, and data obtained by decrypting the first key with the specific key.

33. A key determination apparatus according to claim 31, wherein the data B is one of data obtained by encrypting the first key with the first key itself, data obtained by decrypting the first key with the first key itself, data obtained by encrypting predetermined shared data with the first key, data obtained by decrypting the predetermined shared data with the first key, and data obtained by encrypting the first key with a specific function.

34. A key determination apparatus according to claim 31, wherein the data C is one of data obtained by encrypting the specific key with the specific key itself, data obtained by decrypting the specific key with the specific key itself, data obtained by encrypting with the specific key a sum of the specific key and shared data changing every encryption, data obtained by decrypting with the specific key the sum of the specific key and shared data changing every encryption, data obtained by encrypting with the specific key shared data changing every encryption, data obtained by decrypting with the specific key the shared data changing every encryption, and data obtained by encrypting the specific key with a specific function.

35. A key determination apparatus according to claim 31, wherein the data D is obtained by encrypting with the specific function data in which the first and specific keys are juxtaposed.

36. A key determination apparatus for determining at a receiving side, which one of a plurality of first data received from a transmitting side has been obtained by encrypting/decrypting a first key using a specific key, the apparatus comprising:

first input means for inputting the plurality of first data, each first data having been obtained at the transmitting side by encrypting/decrypting the first key using each one of a plurality of second keys, the plurality of second keys including the specific second key;

second input means for inputting second data from the transmitting side, the second data having been obtained at the transmitting side by encrypting/decrypting the first key using the first key;

execution means for executing a processing on the plurality of first data and the second data using the specific key to determine which one of the plurality of first data has been obtained by encrypting/decrypting the first key using the specific second key; and output means for outputting the first key obtained by the processing using the specific second key from the determined one of the plurality of first data.

37. A program storage device which stores a program readable from a machine in order to execute a key determination step for determining, at a receiving side, which one of a plurality of first data received from a transmitting side has been obtained by encrypting/decrypting a first key using a specific key corresponding to a specific key of the receiving side, the key determination step comprising the steps of:

inputting the plurality of first data, each first data having been obtained at the transmitting side by encrypting/decrypting the first key using each one of a plurality of second keys, the plurality of second keys including the second key corresponding to the specific key of the receiving side;

inputting second data from the transmitting side, the second data having been obtained at the transmitting side by executing a first processing on at least one of the first key and the second key;

executing a second processing including the first processing on the plurality of first data, the second data, and the specific key of the receiving side, to determine which one of the plurality of first data has been obtained by encrypting/decrypting the first key using the second key corresponding to the specific key of the receiving side; and outputting the first key obtained from the determined one of the plurality of first data by using the specific key.

38. A program storage medium which stores a program readable from a machine in order to execute a key determination step for determining, at a receiving side, which one of a plurality of first data received from a transmitting side has been obtained by encrypting/decrypting a first key using a specific key corresponding to a specific key of the receiving side, the key determination step comprising the steps of:

inputting the first data from the transmitting side, the first data having been obtained at the transmitting side by encrypting/decrypting the first key using the specific key of the transmitting side;

inputting second data from the transmitting side, the second data having been obtained at the transmitting side by executing a first processing on at least one of the first key and the specific key;

executing a second processing including the first processing on the first data, the second data, and the plurality of second keys of the receiving side, to determine which one of the plurality of second keys corresponds to the specific key of the transmitting side used in obtaining the first data; and outputting the first key obtained from the first data by using the determined one of the plurality of second keys.

39. A program storage medium which stores a program readable from a machine in order to execute a key determination step for determining, at a receiving side, which one of a plurality of first data received from a transmitting side has been obtained by encrypting/decrypting a first key using a specific key corresponding to a specific key of the receiving side, the key determination step comprising the steps of:

inputting the plurality of first data, each first data having been obtained at the transmitting side by encrypting/decrypting the first key using each one of a plurality of second keys, the plurality of second keys including the specific second key;

inputting second data from the transmitting side, the second data having been obtained at the transmitting side by encrypting/decrypting the first key using the first key;

executing a processing on the plurality of first data and the second data using the specific key to determine which one of the plurality of first data has been obtained by encrypting/decrypting the first key using the specific second key; and outputting the first key obtained by the processing using the specific second key from the determined one of the plurality of first data.

40. A key determination method for determining, at a receiving side, which one of a plurality of first data received from a transmitting side has been obtained by encrypting/decrypting a first key using a second key corresponding to a specific key of the receiving side, the method comprising steps of:

inputting the plurality of first data, each first data having been obtained at the transmitting side by encrypting/decrypting the first key using each one of a plurality of second keys, the plurality of second keys including the second key corresponding to the specific key of the receiving side;

inputting second data from the transmitting side, the second data having been obtained at the transmitting side by executing a first processing on at least one of the first key and the second key;

executing a second processing opposite to that of the first processing on the plurality of first data, the second data, and the specific key of the receiving side, to determine which one of the plurality of first data has been obtained by encrypting/decrypting the first key using the second key corresponding to the specific key of the receiving side; and outputting the first key obtained from the determined one of the plurality of first data by using the specific key.

41. A key determination method for determining, at a receiving side, which one of a plurality of second keys of the receiving side corresponds to a specific key of the transmitting side, the specific key having been used in obtaining first data at a transmitting side to encrypt/decrypt a first key, the method comprising steps of:

inputting the first data from the transmitting side, the first data having been obtained at the transmitting side by encrypting/decrypting the first key using the specific key of the transmitting side;

inputting second data from the transmitting side, the second data having been obtained at the transmitting side by executing a first processing on at least one of the first key and the specific key;

executing a second processing opposite to that of the first processing on the first data, the second data, and the plurality of second keys of the receiving side, to determine which one of the plurality of second keys corresponds to the specific key of the transmitting side used in obtaining the first data; and outputting the first key obtained from the first data by using the determined one of the plurality of second keys.

42. The method according to claim 41, wherein the specific key of the transmitting side is identical to one of the plurality of the specific keys of the receiving side, and the first data have been obtained at the transmitting side by using said one of the plurality of the specific keys.

43. A key determination apparatus for determining, at a receiving side, which one of a plurality of first data received from a transmitting side has been obtained by encrypting/decrypting a first key using a second key corresponding to a specific key of the receiving side, the apparatus comprising:

first input means for inputting the plurality of first data, each first data having been obtained at the transmitting side by encrypting/decrypting the first key using each one of a plurality of second keys, the plurality of second keys including the second key corresponding to the specific key of the receiving side;

second input means for inputting second data from the transmitting side, the second data having been obtained at the transmitting side by executing a first processing on at least one of the first key and the second key;

execution means for executing a second processing opposite to that of the first processing on the plurality of first data, the second data, and the specific key of the receiving side, to determine which one of the plurality of first data has been obtained by encrypting/decrypting the first key using the second key corresponding to the specific key of the receiving side; and output means for outputting the first key obtained from the determined one of the plurality of first data by using the specific key.

44. A key determination apparatus according to claim 43, wherein the second input means inputs, as the second data, at least one of data A generated at the transmitting side on the basis of the first and second keys, data B generated at the transmitting side on the basis of only the first key, data C generated at the transmitting side on the basis of only the second key, and data D generated at the transmitting side using neither the first key nor the second key.

45. A key determination apparatus according to claim 44, wherein the data A is one of data obtained by encrypting the second key with the first key, data obtained by decrypting the second key with the first key, data obtained by encrypting the first key twice with the second key, and data obtained by decrypting the first key with the second key.

46. A key determination apparatus according to claim 44, wherein the data B is one of data obtained by encrypting the first key with the first key itself, data obtained by decrypting the first key with the first key itself, data obtained by encrypting predetermined shared data with the first key, data obtained by decrypting the predetermined shared data with the first key, and data obtained by encrypting the first key with a specific function.

47. A key determination apparatus according to claim 44, wherein the data C is one of data obtained by encrypting the second key with the second key itself, data obtained by decrypting the second key with the second key itself, data obtained by encrypting with the second key a sum of the second key and shared data changing every encryption, data obtained by decrypting with the second key the sum of the second key and shared data changing every encryption, data obtained by encrypting with the second key shared data changing every encryption, data obtained by decrypting with the second key the shared data changing every encryption, and data obtained by encrypting the second key with a specific function.

48. A key determination apparatus according to claim 44, wherein the data D is obtained by encrypting with the specific function data in which the first and second keys are juxtaposed.

49. A key determination apparatus for determining, at a receiving side, which one of a plurality of second keys of the receiving side corresponds to a specific key of the transmitting side, the specific key having been used in obtaining first data at a transmitting side to encrypt/decrypt a first key, the apparatus comprising:

first input means for inputting the first data from the transmitting side, the first data having been obtained at the transmitting side by encrypting/decrypting the first key using the specific key of the transmitting side;

second input means for inputting second data from the transmitting side, the second data having been obtained at the transmitting side by executing a first processing on at least one of the first key and the specific key;

execution means for executing a second processing opposite to that of the first processing on the first data, the second data, and the plurality of second keys of the receiving side, to determine which one of the plurality of second keys corresponds to the specific key of the transmitting side used in obtaining the first data; and output means for outputting the first key obtained from the first data by using the determined one of the plurality of second keys.

50. A key determination apparatus according to claim 49, wherein the second input means inputs, as the second data, at least one of data A generated at the transmitting side on the basis of the first and specific keys, data B generated at the transmitting side on the basis of only the first key, data C generated at the transmitting side on the basis of only the specific key, and data D generated at the transmitting side using neither the first key nor the specific key.

51. A key determination apparatus according to claim 50, wherein the data A is one of data obtained by encrypting the specific key with the first key, data obtained by decrypting the specific key with the first key, data obtained by encrypting the first key twice with the specific key, and data obtained by decrypting the first key with the specific key.

52. A key determination apparatus according to claim 50, wherein the data B is one of data obtained by encrypting the first key with the first key itself, data obtained by decrypting the first key with the first key itself, data obtained by encrypting predetermined shared data with the first key, data obtained by decrypting the predetermined shared data with the first key, and data obtained by encrypting the first key with a specific function.

53. A key determination apparatus according to claim 50, wherein the data C is one of data obtained by encrypting the specific key with the specific key itself, data obtained by decrypting the specific key with the specific key itself, data obtained by encrypting with the specific key a sum of the specific key and shared data changing every encryption, data obtained by decrypting with the specific key the sum of the specific key and shared data changing every encryption, data obtained by encrypting with the specific key shared data changing every encryption, data obtained by decrypting with the specific key the shared data changing every encryption, and data obtained by encrypting the specific key with a specific function.

54. A key determination apparatus according to claim 50, wherein the data D is obtained by encrypting with the specific function data in which the first and specific keys are juxtaposed.

55. A program storage device which stores a program readable from a machine in order to execute a key determination step for determining, at a receiving side, which one of a plurality of first data received from a transmitting side has been obtained by encrypting/decrypting a first key using a specific key corresponding to a specific key of the receiving side, the key determination step comprising the steps of:

inputting the plurality of first data, each first data having been obtained at the transmitting side by encrypting/decrypting the first key using each one of a plurality of second keys, the plurality of second keys including the second key corresponding to the specific key of the receiving side;

inputting second data from the transmitting side, the second data having been obtained at the transmitting side by executing a first processing on at least one of the first key and the second key;

executing a second processing opposite to that of the first processing on the plurality of first data, the second data, and the specific key of the receiving side, to determine which one of the plurality of first data has been obtained by encrypting/decrypting the first key using the second key corresponding to the specific key of the receiving side; and outputting the first key obtained from the determined one of the plurality of first data by using the specific key.

56. A program storage medium which stores a program readable from a machine in order to execute a key determination step for determining, at a receiving side, which one of a plurality of first data received from a transmitting side has been obtained by encrypting/decrypting a first key using a specific key corresponding to a specific key of the receiving side, the key determination step comprising the steps of:

inputting the first data from the transmitting side, the first data having been obtained at the transmitting side by encrypting/decrypting the first key using the specific key of the transmitting side;

inputting second data from the transmitting side, the second data having been obtained at the transmitting side by executing a first processing on at least one of the first key and the specific key;

executing a second processing opposite to that of the first processing on the first data, the second data, and the plurality of second keys of the receiving side, to determine which one of the plurality of second keys corresponds to the specific key of the transmitting side used in obtaining the first data; and outputting the first key obtained from the first data by using the determined one of the plurality of second keys.

* * * * *